(12) United States Patent
Amada et al.

(10) Patent No.: US 7,206,014 B2
(45) Date of Patent: Apr. 17, 2007

(54) MULTI-BEAM PITCH ADJUSTING APPARATUS AND IMAGE FORMING APPARATUS

(75) Inventors: Taku Amada, Yokohama (JP); Kazuyuki Shimada, Chofu (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/200,778

(22) Filed: Jul. 24, 2002

(65) Prior Publication Data
US 2003/0025782 A1 Feb. 6, 2003

(30) Foreign Application Priority Data
Jul. 24, 2001 (JP) ............... 2001-223363
Oct. 12, 2001 (JP) ............... 2001-315011

(51) Int. Cl.
*B41J 15/14* (2006.01)
*B41J 27/00* (2006.01)

(52) U.S. Cl. ...................... 347/242; 347/257

(58) Field of Classification Search ............... 347/130, 347/238, 241–245, 256–261, 233–236, 248–250, 347/263; 359/204
See application file for complete search history.

(56) References Cited

U.S. PATENT DOCUMENTS

| | | | |
|---|---|---|---|
| 4,760,251 A | 7/1988 | Shimada et al. ............ 250/235 |
| 5,786,594 A * | 7/1998 | Ito et al. ..................... 250/236 |
| 5,943,086 A | 8/1999 | Watabe et al. .............. 347/235 |
| 5,952,649 A | 9/1999 | Amada ........................ 250/234 |
| 5,999,345 A * | 12/1999 | Nakajima et al. .......... 359/821 |
| 6,381,057 B1 | 4/2002 | Itabashi ...................... 359/204 |
| 6,400,391 B1 | 6/2002 | Suhara et al. ............... 347/244 |
| 6,429,956 B2 | 8/2002 | Itabashi ...................... 359/204 |
| 6,469,772 B1 | 10/2002 | Itabashi ...................... 355/47 |
| 6,596,985 B2 | 7/2003 | Itabashi ...................... 250/234 |

(Continued)

FOREIGN PATENT DOCUMENTS

JP 09015521 A * 1/1997

(Continued)

OTHER PUBLICATIONS

Pending U.S. Appl. No. 10/127,768, filed Apr. 23, 2002, Nakajima.

(Continued)

*Primary Examiner*—Hai Pham
(74) *Attorney, Agent, or Firm*—Oblon, Spivak, McClelland, Maier & Neustadt, P.C.

(57) ABSTRACT

A multi-beam scanning apparatus includes a light source having first and second light source sections that hold a pair of semi-conductor laser diodes and coupling lenses that couple four beams irradiated from the pair of semi-conductor laser diodes with a base member. A light beam deviating device may be provided so as to deviate the four beams. A scan imaging device is also provided so as to scan a scan receiving surface with beam spots of the beams deviated by the light beam deviating device. A beam pitch-detecting device is also provided so as to detect a beam pitch of the respective beams formed on the scan-receiving surface. A beam pitch correcting device is provided in order to correct the beam pitch by causing relative deviation of a light axis among the respective beams on a sub scanning direction cross sectional plane.

5 Claims, 32 Drawing Sheets

U.S. PATENT DOCUMENTS

| | | | |
|---|---|---|---|
| 6,621,512 B2 * | 9/2003 | Nakajima et al. | 347/245 |
| 6,624,920 B2 | 9/2003 | Itabashi | 359/205 |
| 6,657,761 B2 | 12/2003 | Suzuki et al. | 359/205 |
| 6,657,765 B2 | 12/2003 | Hayashi et al. | 359/225 |
| 6,686,946 B2 | 2/2004 | Masuda et al. | 347/236 |
| 6,700,687 B1 | 3/2004 | Itabashi | 359/212 |
| 2001/0035999 A1 * | 11/2001 | Saito et al. | 359/204 |

FOREIGN PATENT DOCUMENTS

JP          09325288 A  *  12/1997

OTHER PUBLICATIONS

Pending U.S. Appl. No. 09/946,482, filed Sep. 6, 2001, Unknown.
Pending U.S. Appl. No. 09/552,657, filed Apr. 19, 2000, Nakajima.
Pending U.S. Appl. No. 09/769,510, filed Jan. 26, 2001, Nakajima et al.
Pending U.S. Appl. No. 09/827,097, filed Apr. 6, 2001, Ono.
Pending U.S. Appl. No. 09/873,256, filed Jun. 5, 2001, Ema et al.
Pending U.S. Appl. No. 09/888,600, filed Jun. 26, 2001, Andoh et al.
Pending U.S. Appl. No. 10/028,698, filed Dec. 28, 2001, Hayashi.
Pending U.S. Appl. No. 10/047,698, filed Jan. 18, 2002, Suzuki.
Pending U.S. Appl. No. 10/059,371, filed Jan. 31, 2002, Ono.
Pending U.S. Appl. No. 10/047,092, filed Jan. 17, 2002, Atsuumi.
Pending U.S. Appl. No. 10/084,485, filed Feb. 28, 2002, Nakajima.
Pending U.S. Appl. No. 10/143,013, filed May 13, 2002, Suhara et al.
Pending U.S. Appl. No. 10/102,633, filed Mar. 22, 2002, Ameyama et al.
Pending U.S. Appl. No. 10/161,659, filed Jun. 5, 2002, Suzuki et al.
Pending U.S. Appl. No. 10/161,756, filed Jun. 5, 2002, Atsuumi et al.
Pending U.S. Appl. No. 10/183,748, filed Jun. 28, 2002, Nihei et al.
Pending U.S. Appl. No. 10/207,241, filed Jul. 30, 2002, Suzuki et al.
Pending U.S. Appl. No. 10/200,778, filed Jul. 24, 2002, Amada et al.
Pending U.S. Appl. No. 10/233,294, filed Aug. 20, 2002, Satoh et al.
Pending U.S. Appl. No. 10/319,624, filed Dec. 16, 2002, Ono et al.
U.S Appl. No. 10/200,778, filed Jul. 24, 2002, Amada et al.
[] U.S. Appl. No. 10/200,778, filed Jul. 24, 2002, Amada et al.
[] U.S Appl. No. 10/200,778, filed Jul. 24, 2002, Amada et al.
Abandonded U.S. Appl. No. 10/347,746, filed Jan. 22, 2003, Suzuki et al.
U.S. Appl. No. 10/200,778, filed Jul. 24, 2002.
U.S Appl. No. 10/840,369, filed May 7, 2004, Itabashi et al.
U.S. Appl. No. 10/200,778, filed Jul. 24, 2002, Amada et al.
U.S. Appl. No. 10/840,369, filed May 7, 2004, Itabashi et al.

* cited by examiner

OPTICAL SANNING APPARATUS 100

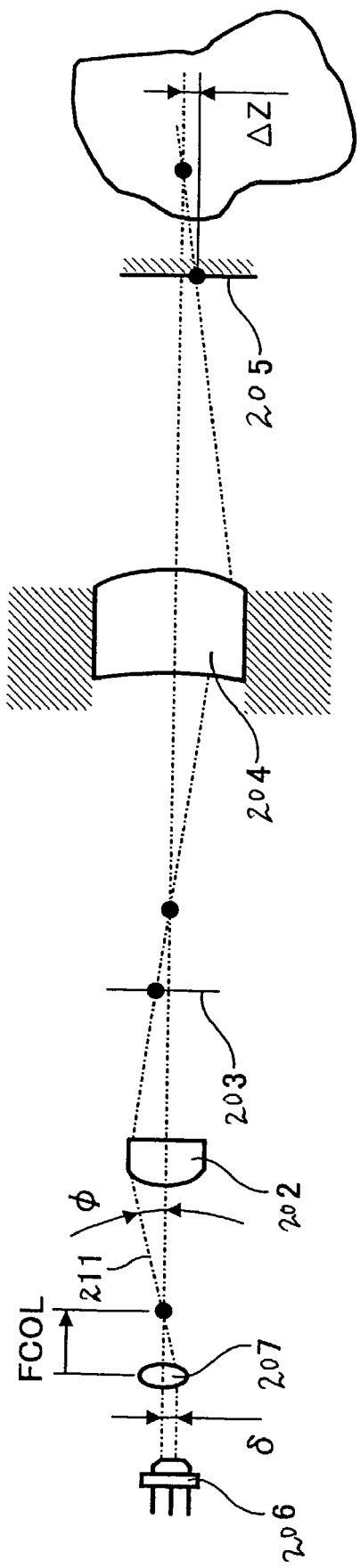

MULTI-BEAM PITCH ADJUSTING APPARATUS AND IMAGE FORMING APPARATUS

CROSS REFERENCE TO RELATED APPLICATIONS

This application claims priority under 35 USC §119 to Japanese Patent Application Nos. 2001-223363 and 2001-315011 filed on Jul. 24, and Oct. 12, both 2001, the entire contents of which are herein incorporated by reference.

BACKGROUND OF THE INVENTION

1. Field of the Invention

The present invention generally relates to a multi-beam scanning apparatus that simultaneously outputs a plurality of beams, and an image forming apparatus that writes an image with a multi-beam, and more particularly to a technology capable of detecting and correcting a beam pitch on a scan receiving surface in accordance with a detection result.

2. Discussion of the Background

Among various image forming apparatuses using an electro-photographic system, such as a copier, a printer, a facsimile etc., there is an image forming apparatus capable of enabling a multi-beam light source apparatus to simultaneously irradiate and write a plurality of laser beams on a plurality of lines in order to increase a writing speed. For example, Japanese Patent Application Laid Open No. 9-80331 refers to a multi-beam light source apparatus including a device capable of correcting a beam pitch, which is an interval in a sub scanning direction, on a scan receiving surface by displacing either an optical element disposed in plural light paths so as to permit transmission or reflect a beam or a line image imaging element. Further, Japanese Patent Application Laid Open No. 6-110273 refers to an optical scanning apparatus that includes a beam combining device capable of combining a plurality of laser beams output from a plurality of laser light sources, and a device capable of correcting a beam pitch by inclining a transparent parallel plate inserted at least between one of the laser light sources and the beam combing device.

In addition, Japanese Patent Application Laid Open No. 11-23988 refers to a multi-beam light source apparatus integrally installing first and second light source sections respectively including a plurality of semi-conductor laser diodes and collimate lenses, a supporting member that integrally supports these devices, and a beam combining device that approximates and irradiates light beams output from the first and second light source sections in a holder. Since the above-described multi-beam light source apparatus of Japanese Patent Application Laid Open No. 11-23988 integrally includes a plurality of members, if each of the members is made of different material, a thermal expansion amount of material varies and an optical axis of the laser beam is relatively deviated along with a temperature change, thereby an interval (i.e., a beam pitch) between scanning lines on a scan receiving surface of a photo-conductive surface possibly changes. In such a situation, the beam pitch can be corrected when the technologies of Japanese Patent Application Laid Open Nos. 9-80331 and 6-110273 are applied to.

However, when the former device is applied to, there arises a problem that another beam property (e.g. a beam spot radius) possibly deteriorates. In addition, due to a limit of physical arrangement, the latter device can probably not be applied to the above-described multi-beam light source apparatus.

Further, when a method of combining a plurality of laser beams with a beam combining device is utilized, a change in a beam pitch or scanning line interval on a scan receiving surface frequently arises as a problem along a change in environment and time elapsing when compared with a method in which a semi-conductor laser array is utilized as a light source unit.

To resolve such a problem, below described apparatuses have been proposed. Specifically, Japanese Patent Application Laid Open No. 2000-227563 refers to a multi beam optical scanning apparatus capable of combining laser beams irradiated from a plurality of light sources with a beam-combining prism. In particular, the apparatus adjusts a beam spot position on a scan receiving surface by shifting the beam combining prism along a light path and adjusting its inclination on either a main or sub scanning direction cross sectional planes so as to adjust an irradiation direction of the light beam.

Japanese Patent Application Laid Open No. 10-215351 also refers to a light beam scanning apparatus capable of combining laser beams irradiated from a plurality of light sources with a beam combining prism. In particular, the apparatus adjusts a beam spot position on a scan receiving surface by shifting a cylindrical lens, which forms a line image on a reflection surface of a polygon mirror, in a sub scanning direction, and adjusting an irradiation direction of the light beam. Japanese Patent application Laid Open No. 9-189873 also refers to a multi beam scanning apparatus and method capable of combining laser beams irradiated from a plurality of light sources with a half mirror. In particular, the apparatus adjusts a beam spot position on a scan receiving surface by adjusting inclinations of all of a galvanometer mirror provided on a light path and a light source apparatus, and thereby adjusting an irradiation direction of the light beam.

All of the above-described background technologies detect a change in arrangement of beam spots, which change is caused by a temperature change or time elapsing or the like, on the scan receiving surface, and performs feedback adjustment based upon its detection result.

However, it is sometimes difficult for a system that combines light beams irradiated from a plurality of light sources with a beam-combining device to initially adjust (set) beam spots on the scan receiving surface to a prescribed value, when a light source apparatus (or an optical scanning apparatus) is assembled, because of affection of parts processing, assembling, and adjustment errors or the like.

The inventors are unaware of an optical scanning apparatus capable of readily performing such initial and feedback adjustment.

SUMMARY OF THE INVENTION

Accordingly, an object of the present invention is to address and resolve the above and other problems and provide a new multi-beam scanning apparatus.

The above and other objects are achieved by a multi-beam scanning apparatus including a light source unit having first and second light source sections configured to hold a pair of semi-conductor laser diodes and coupling lenses with a base member and configured to couple respective beams irradiated from the pair of semi-conductor laser diodes. A light beam deviating device is provided so as to deviate four beams irradiated from the first and second light source sections. Further, a scan imaging device is also provided so as to scan a scan receiving surface with beam spots of the beams deviated by the light beam deviating device, and a beam pitch-detecting device is provided so as to detect a beam pitch of the respective beams formed on the scan-receiving surface. Also included is a beam pitch correcting device to correct the beam pitch by relatively deviating a light axis among the respective beams on a sub scanning direction cross sectional plane.

In yet another embodiment, an image forming apparatus for forming an image using an electro-photographing system includes a plurality of light source apparatuses configured to irradiate light beams, and at least one of the plurality of light source apparatuses includes first and second light source sections respectively configured to hold a pair of semi-conductor laser diodes and coupling lenses with a base member and configured to couple beams irradiated from the pair of semi-conductor laser diodes. A light beam deviating device is provided so as to deviate the beams irradiated from the light source units and at least one scan imaging device is provided so as to scan different scan receiving surfaces with beam spots of the beams deviated by the light beam deviating device. A beam pitch-detecting device is also provided so as to detect a beam pitch of the beams formed on the scan-receiving surface. A beam pitch correcting device is provided in order to correct the beam pitch by relatively deviating a light axis to that of the other beam on a sub scanning direction cross sectional plane.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIG. 17 is an extended chart illustrating the sub scanning direction cross section of an optical scanning unit of the optical scanning apparatus of FIG. 1;

DETAILED DESCRIPTION OF THE PREFERRED EMBODIMENT

Figure 2:
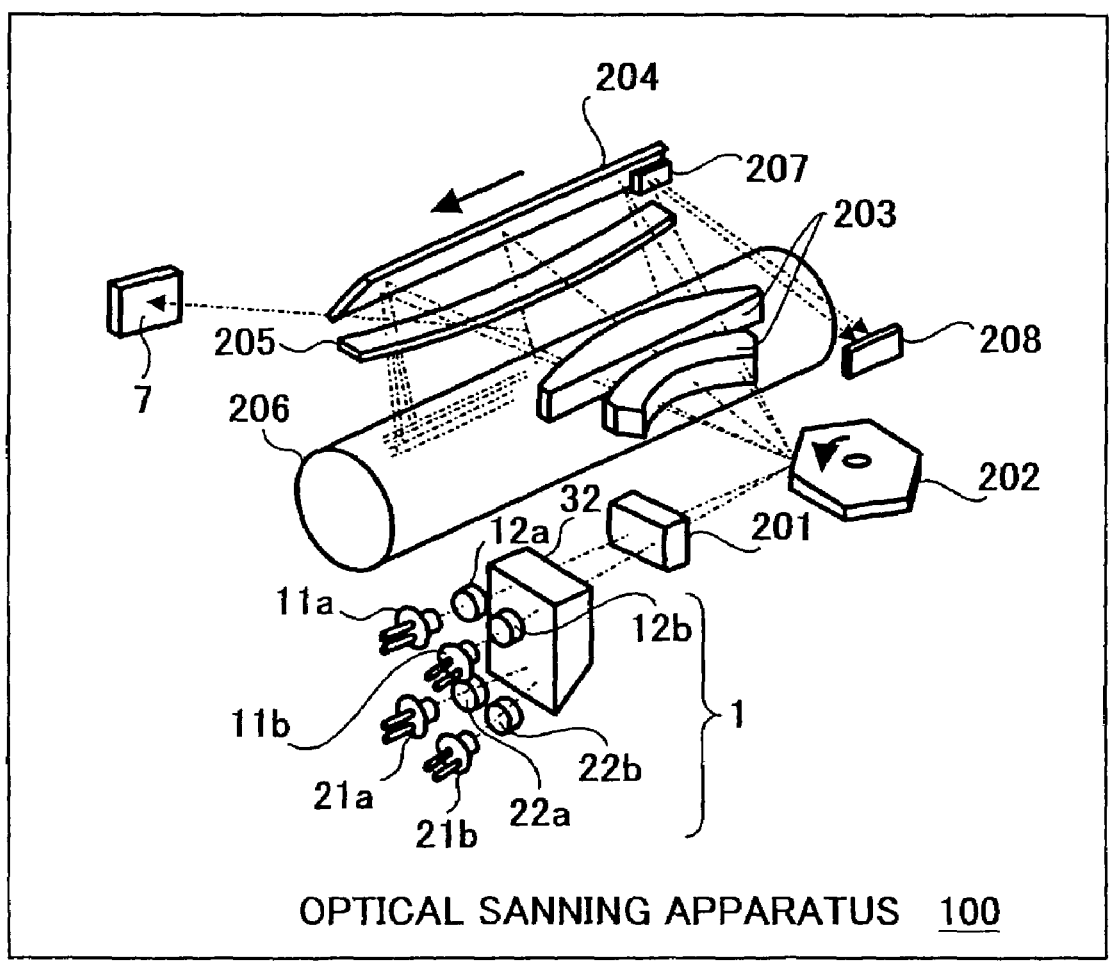
FIG. 2 is a perspective view illustrating a first exemplary optical scanning apparatus disposed in a color laser printer serving as one example of an image forming apparatus according to the present invention.

Referring now to the drawings, wherein like reference numerals and marks designate identical or corresponding parts throughout several views, FIG. 2 is a perspective view illustrating a schematic configuration of an optical scanning apparatus 100 disposed in a color laser printer serving as an exemplary image forming apparatus. As shown, the optical scanning apparatus 100 includes a light source apparatus 1, a cylindrical lens 201, a polygon mirror 202, an Fθ lens 203, a reflection mirror 204, a correction use lens 205, a photoconductive drum 206, a mirror 207, and a sensor baseboard 208. The optical scanning apparatus 100 irradiates four laser beams from the light source apparatus 1, and enables the cylindrical lens 201 to fair respective laser beams to those having small radiuses and prescribed shapes of lateral cross sections. Then, such faired laser beams are irradiated to the polygon mirror 202 rotating in a prescribed rotational speed, and so that respective laser beams are periodically deflected. In addition, the Fθ lens 203 then converts the deflected laser beam from equiangular to equal speed movement and form a long line image in a main scanning direction.

The reflection mirror 204 then changes an angle thereof. The correction use lens 205 performs plane-tilting correction. The faired laser beam is then be irradiated to a surface of the PC drum 206 rotating in a sub scanning direction. In such a way, an image is formed while the four beam spots respectively having a prescribed radius scan the surface of the PC drum 206 in the constant speed. In addition, each laser beam also enters into a beam detection section 7 disposed at a position other than a writing position of a scanning start end as described later in detail.

Figure 1:
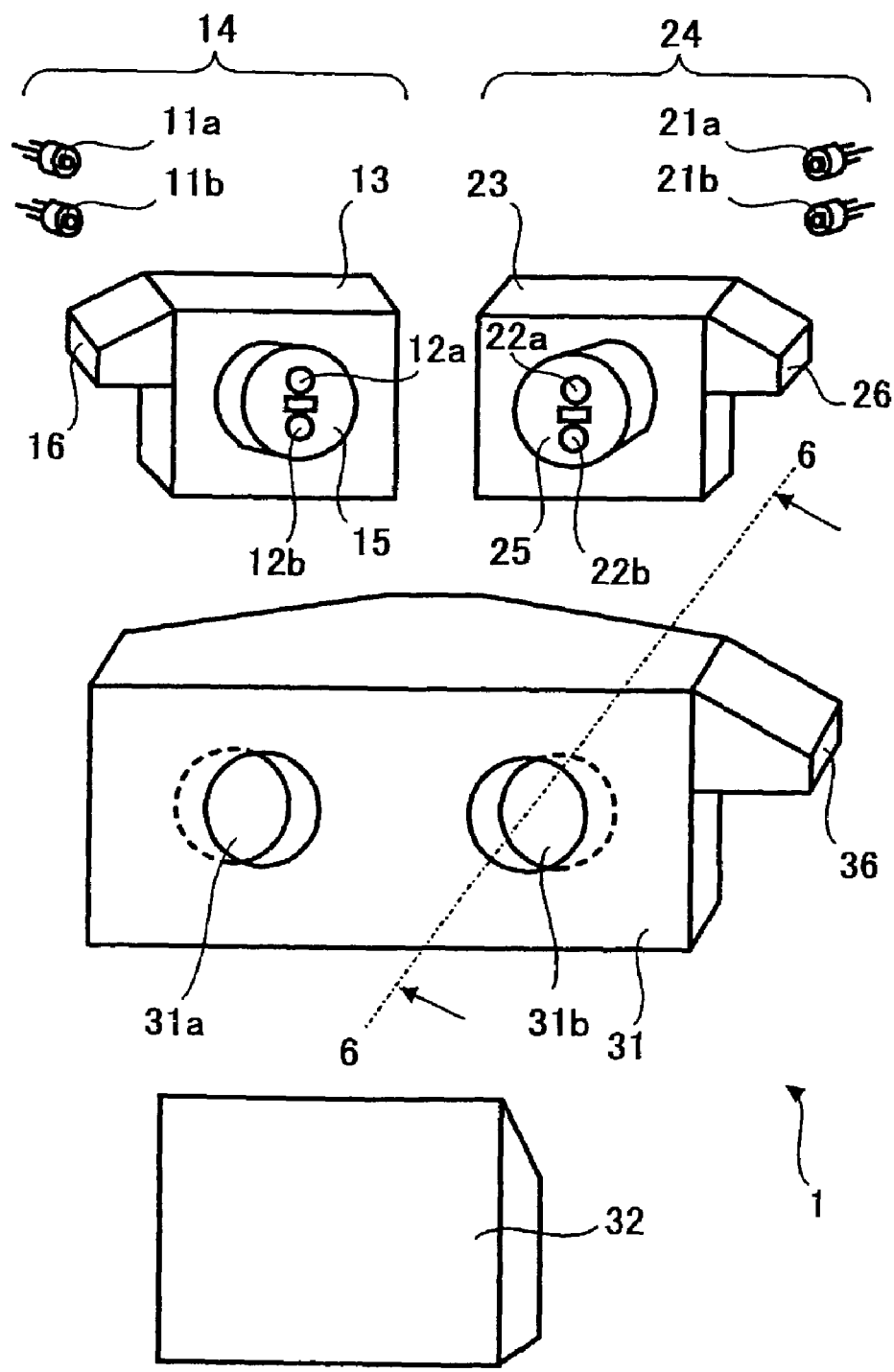
FIG. 1 is an exploded perspective view illustrating an exemplary configuration of a multi-beam light source apparatus according to the present invention.

The light source apparatus 1 may be a four beam type light source apparatus and is constituted by first and second light source sections 14 and 24, a holder member 31, a beam combining prism 32 as illustrated in FIG. 1, which is a disassembled perspective view illustrating a configuration of the light source apparatus 1. The first light source section 14 includes a pair of semi-conductor laser diodes 11a and 11b, a pair of coupling lenses 12a and 12b, and a base member 13. The semi-conductor laser diodes 11a and 11b are semi-conductor laser element types. The pair of coupling lenses 12a and 12b respectively collimate a divergent flux. The base member 13 uses an attaching hole for receiving the pair of semi-conductor laser diodes 11a and 11b in a rear side thereof, and a cylindrically shaped lens holding section 15 extruding therefrom for receiving the pair of coupling lenses 12a and 12b in the front side thereof. The base member 13 also uses a projection section 16 on one side surface (a left side surface in a drawing).

The semi-conductor laser diodes 11a and 11b are pressure inserted and held in the attaching hole of the base member 13 from the rear side thereof. The coupling lenses 12a and 12b are secured to the lens holding section 15 of the base member 13 by a construction method such as adhesive bonding. The coupling lenses 12a and 12b are attached so that beam ejection directions and collimating rates of light beams 19a and 19b irradiated from the semi-conductor laser diodes 11a and 11b fall within prescribe values considering a property of the subsequent optical unit (see FIG. 3). The second light source section 24 is similarly configured to the above-described first light source section 14. Specifically, the second light source section 24 includes a pair of semi-conductor laser diodes 21a and 21b, a pair of coupling lenses 22a and 22b, and a base member 23. The semi-conductor laser diodes 21a and 21b have similar configurations to the semi-conductor laser diodes 11a and 11b. The pair of coupling lenses 22a and 22b also have similar configurations to the coupling lenses 12a and 12b. The base member 23 has a similar configuration to the base member 13 except for a position of the projection member 26.

The holder member 31 holds the first and second light source sections 14 and 24, and include a pair of attaching holes 31a and 31b having shapes matching with external shapes of the lens holding sections 15 and 25 of the base members 13 and 23, respectively. A projection section 36 is also formed in one side. The holder member 31 holds both the base members 13 and 23 while the lens holding sections 15 and 25 are pressure inserted to the respective attaching holes 31a and 31b from the rear side. The beam combining prism 32 is arranged at a front side of the holder member 31, and serves as a member for approximating and irradiating two light beams with those being combined. The first and second light source sections 14 and 24, the holder member 31, the beam combining prism 32 are integrally held by the supporting member 5 (see FIG. 6) so as to constitute the light source apparatus 1.

Figure 3:
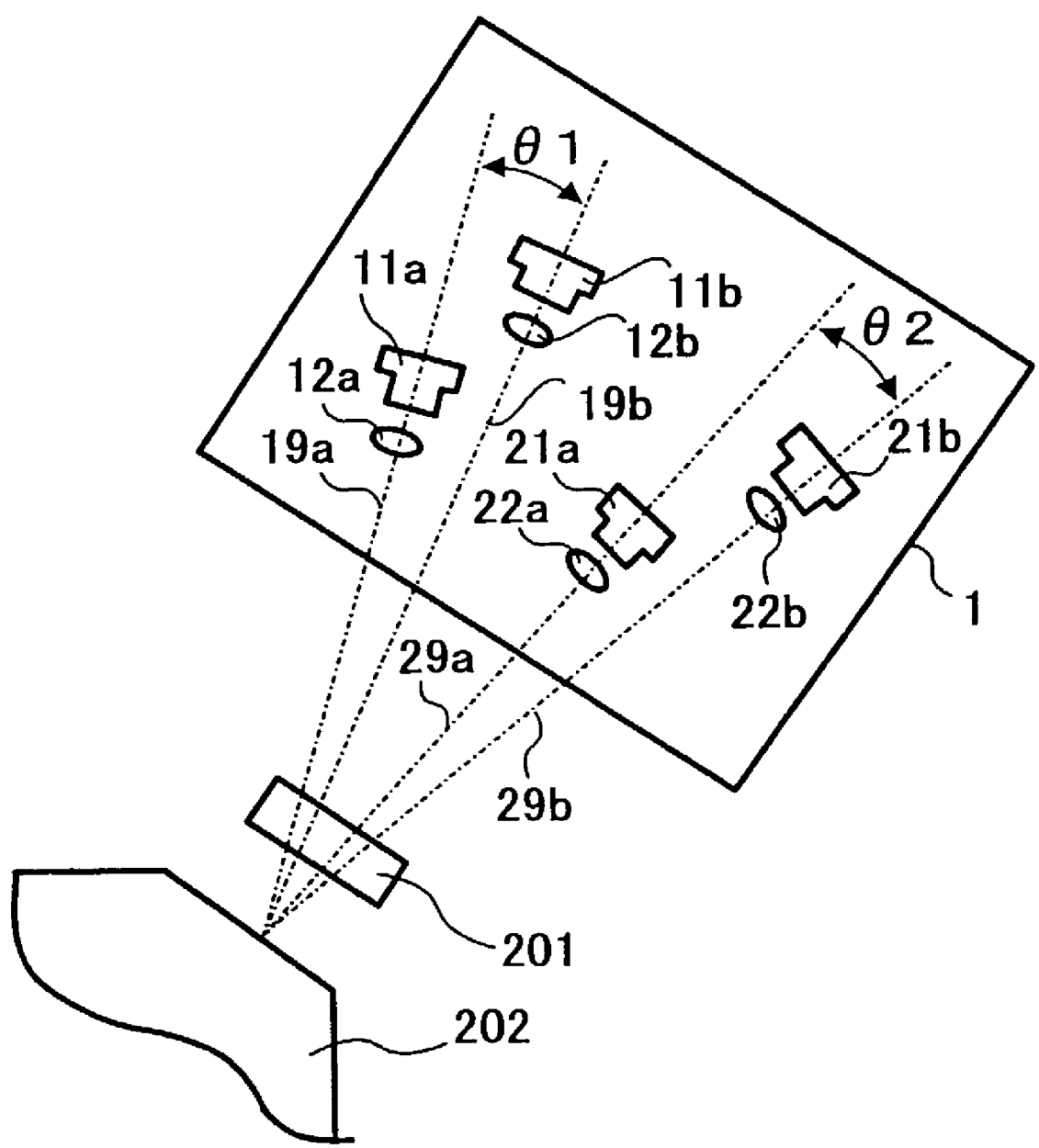
FIG. 3 is a model chart illustrating a multi-beam light source apparatus and laser beams irradiated therefrom according to the present invention.
Figure 5:
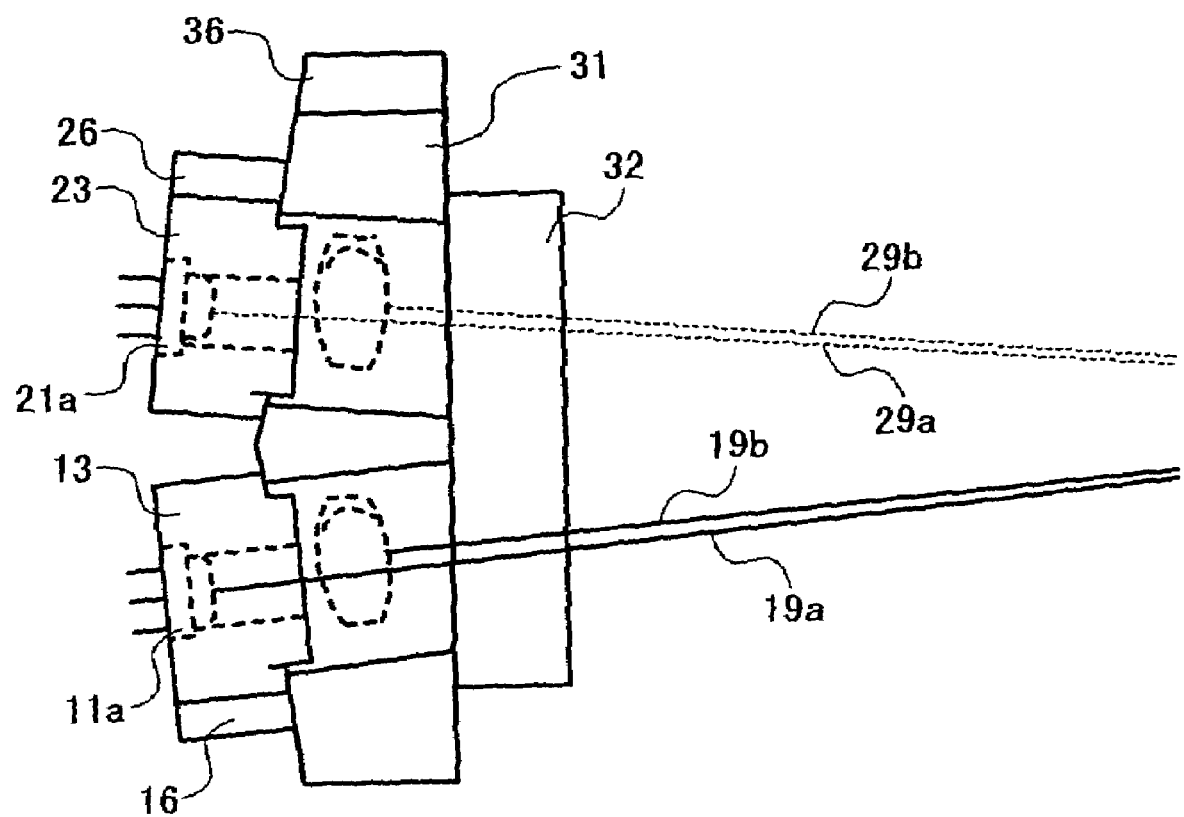
FIG. 5 is a plan view of the multi-beam light source apparatus illustrated in FIG. 1.
Figure 6:
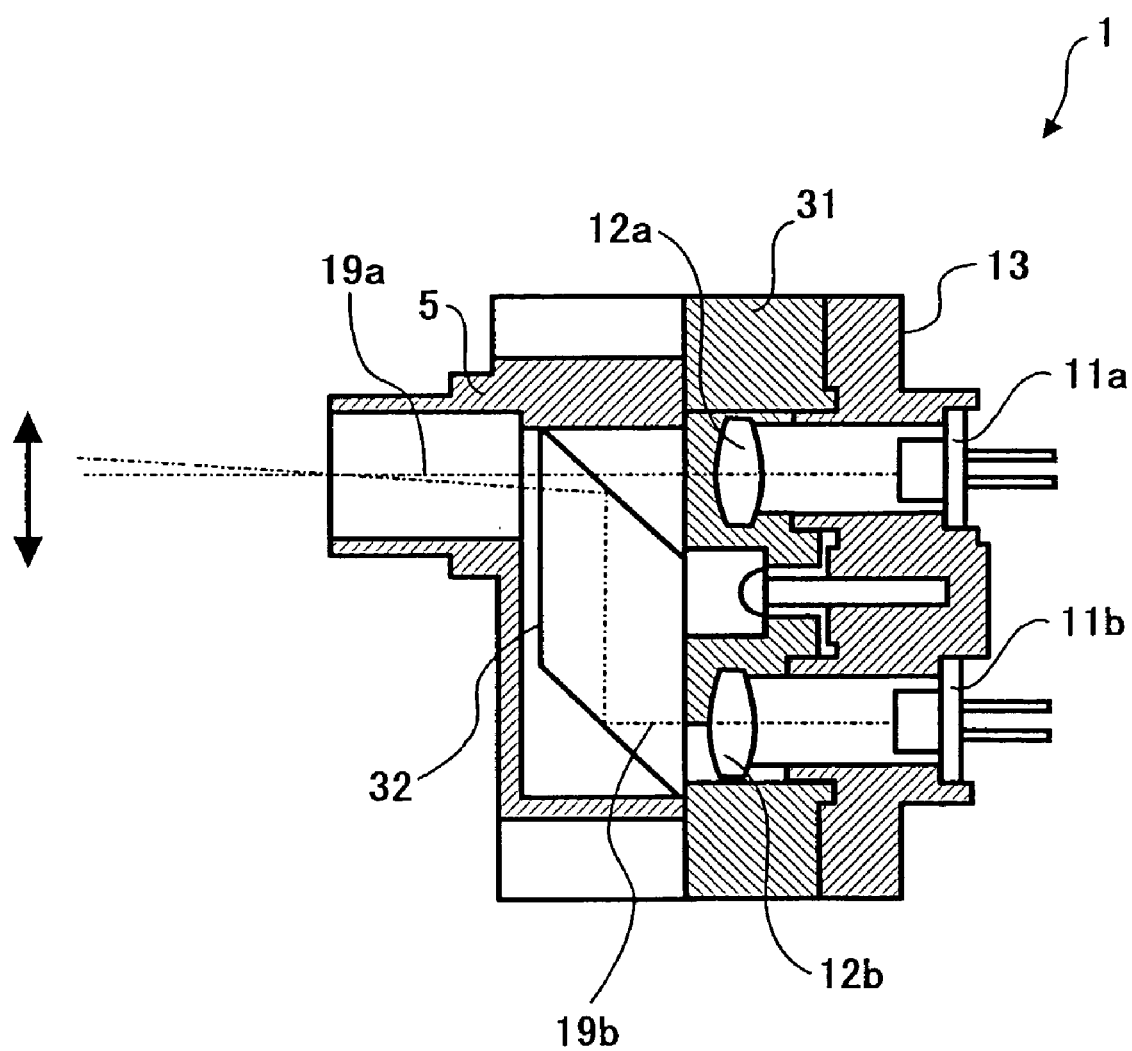
FIG. 6 is a chart illustrating a cross sectional view along the 6—6 line when the multi-beam light source apparatus of FIG. 1 is assembled.

FIG. 5 is a plan view when viewed of a main scanning direction of the light source apparatus 1, and FIG. 6 is a vertical cross sectional view along the 6—6 line when viewed in a sub scanning direction. As illustrated in FIGS. 5 and 6, in the first light source section 14, a light beam 19b irradiated from the semi-conductor laser diode 11b is reflected twice in the beam combining prism 32, and output after being approximated to the light beam 19a irradiated, transmitting and advancing straight through the beam combining prism 32 from the semi-conductor laser diode 11a. A similar event occurs in the second light source apparatus 24. In addition, as illustrated in FIGS. 2 and 3, respective pair of light beams 19a, 19b, and 29a, 29b irradiated from the semi-conductor laser diodes 11a, 11b, 12a, and 12b, intersect in the vicinity of a deviation reflection surface of the polygon mirror 202 on a main scanning direction cross sectional plane so as to decrease deviation of properties of beam spots when formed on a scan receiving surface of the PC drum 206. Specifically, the four beams are not parallel to another on the main scanning direction cross sectional plane.

Figure 7:
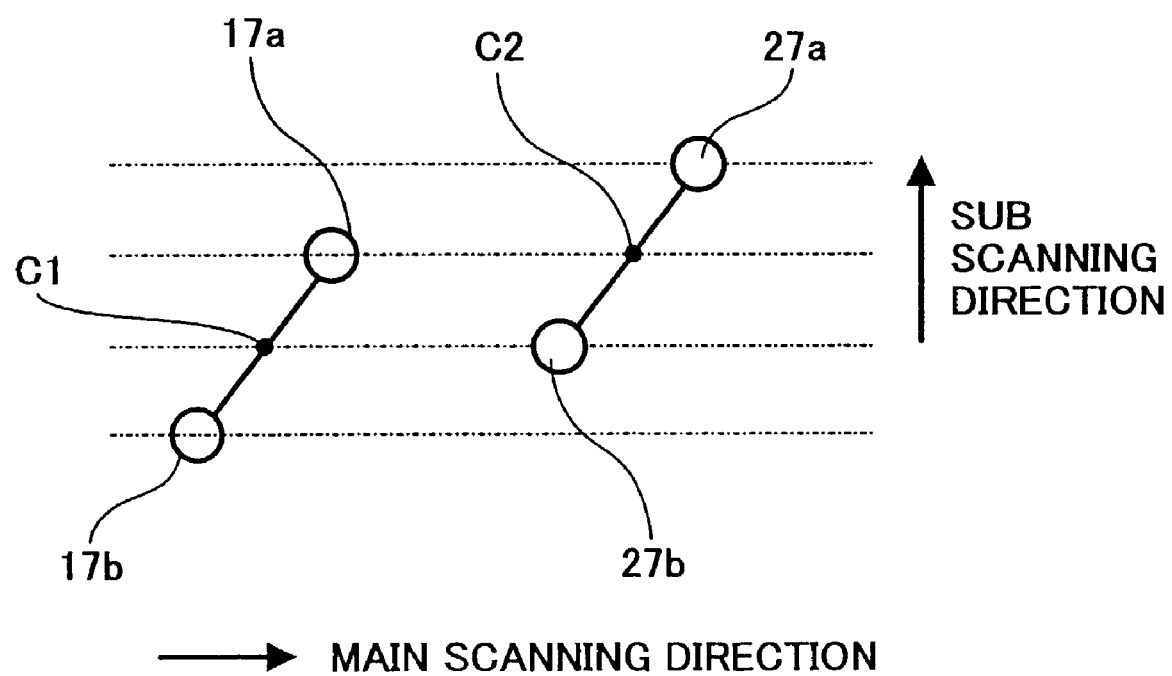
FIG. 7 is a model chart illustrating positional relation of beam spots formed by four light beams on a surface of a PC member.

FIG. 7 is a chart illustrating a pattern diagram of beam spots arranged on the surface of the PC drum 206 by the four light beams 19a, 19b, 29a and 29b. As illustrated in FIG. 7, respective light beams 19a, 19b, 29a and 29b form beam spots 17a, 17b, 27a, and 27b. However, if a virtually middle position of the beam spots 17a and 17b is premised as a center C1, and that of the beam spots 27a and 27b is premised as a center C2, the centers C1 and C2 substantially coincide with positions where respective beam ejection light axis of the first and second light source sections 14 and 24 reach the PC drum 206. The light axes virtually correspond to the respective light axis 18 and 28 of the virtual light beams irradiated from the respective first and second light source sections 14 and 24.

In the optical scanning apparatus 100 configured in the above-described manner, owing to a change in environment, such as temperature and humidity, and elapse of time, the base members 13 and 23 and holder member 31 may be deformed. Further, positional relation, accordingly, an adjusting value between respective semi-conductor laser diodes 11a, 11b, 21a, and 21b, and the coupling lenses 12a, 12b, 22a, and 22b may relatively subtly change. In addition, the first and second light source sections 14 and 24 may themselves sometimes deform. In addition, an attaching posture of the respective semi-conductor laser diodes 11a, 11b, 21a, and 21b may vary. As a result, arrangement of the respective beam spots 17a, 17b, 27a, and 27b formed on the surface of the PC drum 206 may be disturbed as illustrated in FIG. 7, thereby intervals between respective beam spots 17a, 17b, 27a, and 27b may vary.

However, if a beam pitch detection device for detecting respective scanning line intervals (i.e., beam pitches) from information specifying positions of the respective beam spots 17a, 17b, 27a, and 27b on the surface of the PC drum 206, and a beam pitch correcting device for correcting an error of arrangement of respective beam spots are employed, a variation of a beam pitch owing to disturbance of arrangement of the respective beam spots can be corrected. As a result, the beam pitch on the scan-receiving surface can be maintained within a prescribed value.

The beam pitch correction device can manually be driven in accordance with a detection result such as an output signal generated by the beam pitch detection device, thereby a variation of the beam pitch can be corrected. Otherwise, the beam pitch correction device may be operated by a control device in accordance with the detection result. In such a situation, the beam pitch can automatically be corrected even if an operator who drives the beam pitch correcting device is absent as described later in detail. The beam pitch detection device can be the above-described beam detection section 7, and the control device may be the control section 57 (FIG. 13).

Figure 11:
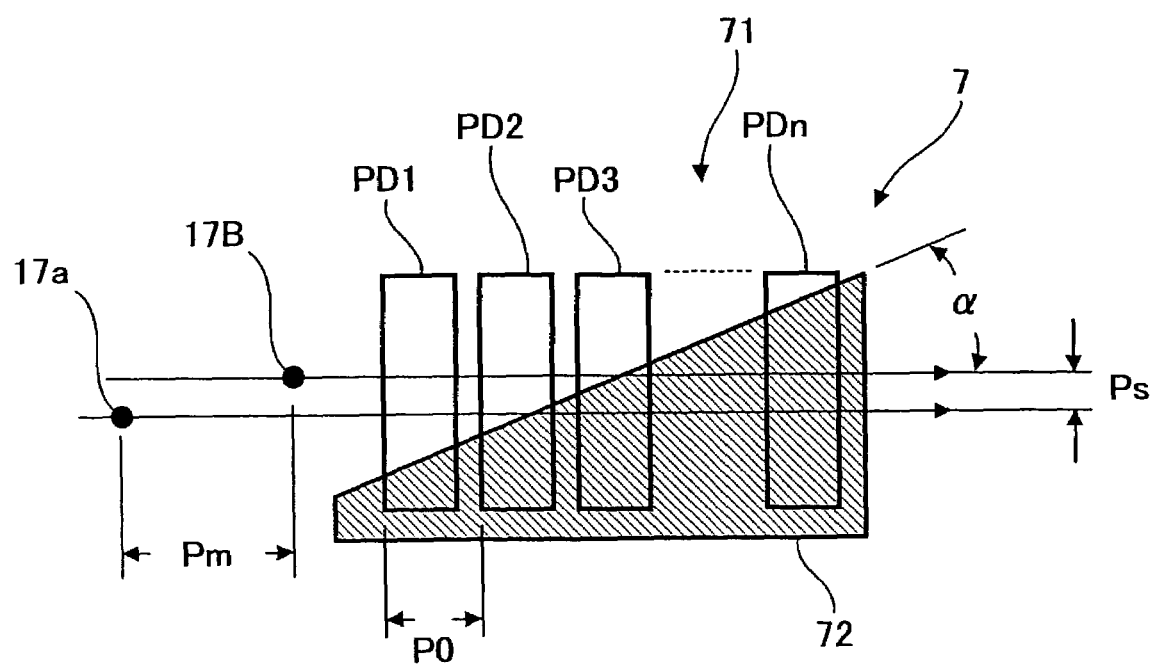
FIG. 11 is a chart illustrating a configuration of a beam detection section.

The beam detection section 7 includes a sensor array 71 and a shade mask 72 as illustrated in FIG. 11. The sensor array 71 includes a plurality of photo-sensors PD1 to PDn arranged in a main scanning direction. The shade mask 72 is arranged with its leading edge inclined in a main scanning direction by a prescribed angle of α, so that it gradually narrows and covers openings of the photo-sensors PD1 to PDn from a scanning start side. Each of the photo-sensors PD1 to PDn has a length of 0.15 mm in the main scanning direction, and 0.8 mm in the sub scanning directions for example. Twelve photo-sensors are arranged at an interval of 0.2 mm. The photo-sensors PD1 to PDn are configured such that a spot radius of an incoming radiation laser beam does not deviates therefrom, when a light quantity of a laser beam having a spot radius of about 80 µm is entered by 100% and there is a change in a scanning position in the sub scanning direction.

Figure 13:
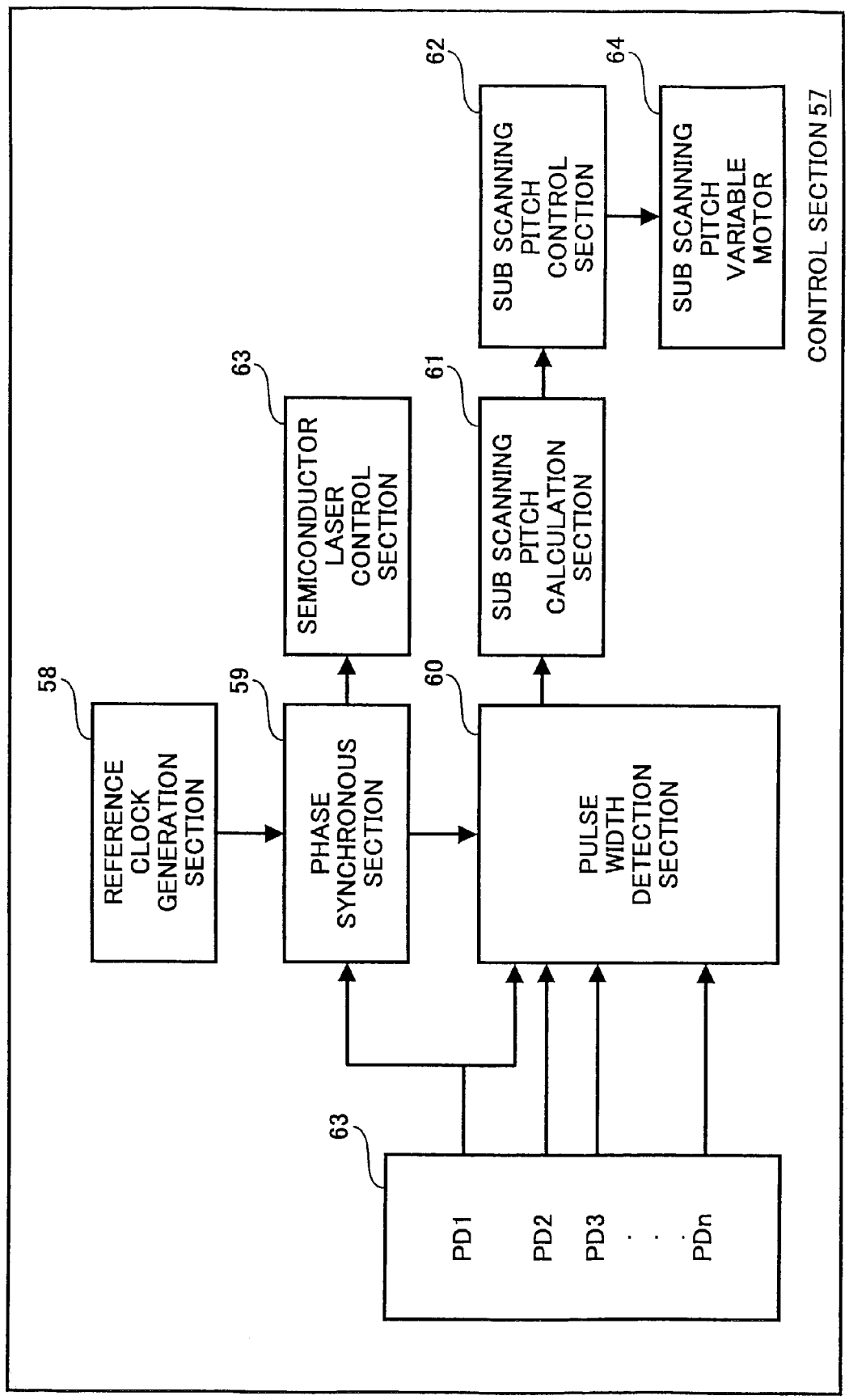
FIG. 13 is a block chart illustrating an exemplary interior configuration of a control section.

The control section 57 detects and controls a scanning line pitch in the sub scanning direction from a beam detection signal output from the beam detection section 7, and has a construction as illustrated in FIG. 13. The control section 57 includes a reference clock generation section 58 for generating a reference clock signal, a phase synchronous section 59, a pulse width detection section 60, a sub scanning pitch calculating section 61, a sub scanning pitch control section 62, and a semi-conductor laser control section 63. The phase synchronous section 59 outputs a clock signal in synchronism with a beam detection signal input from a photo-sensor PD1 located in the scanning start end. The pulse width detection section 60 detects a pulse width of a beam detection signal output from a photo-sensor PD1 uncovered by the shade mask 72 when the beam spots 17a and 17b pass the beam detection section 7, and a pitch interval.

The sub scanning pitch calculating section 61 calculates a pitch of the laser beam in the sub scanning direction from the pulse width detected by the pulse width detection section 60, a pitch interval of the beam detection signal, and the pulse width of the beam detection signal output from the photo-sensors PD2 and PD3 covered by the leading end of the shade mask 72. The sub scanning pitch control section 62 controls a sub scanning pitch variable motor 64 so that a pitch in the sub scanning direction calculated by the sub scanning pitch calculation section 61 can be a reference scanning pitch in accordance with a pixel density. The semi-conductor laser diode control section 63 adjusts (controls) an image writing timing using a clock signal generated by the phase synchronous section 59.

The beam pitch correction device changes both the attaching posture of a member of the light source apparatus 1 and an irradiation direction of the light beam irradiated from the light source apparatus 1 on the sub scanning direction cross sectional plane, and causes a relative deviation of a light axis. The beam pitch correction device thus corrects a beam pitch by changing a scanning position of respective beam spots formed on the surface of the PC drum 206 as a scan receiving surface in the sub scanning direction. A deviation amount ΔZ of a scanning position of each beam spot on the scan receiving surface may be represented as follows:

$$\Delta Z = fcol \times \tan\phi \times m$$

where "fcol" represents a focal length of a coupling lens, and "ϕ" represents an beam ejection direction of a light beam from the light source apparatus 1 in the sub scanning direction cross sectional plane, and "m" represents a sub scan magnification of an entire scanning optical unit.

Accordingly, the beam pitch correction device may preferably appropriately adjust the light axis deviation relatively existing between respective light beams by adjusting beam ejection directions (corresponds to the ϕ) of four light beams in the sub scanning direction cross sectional plane. Thus, the beam pit correction device can correct a scanning line interval on the surface of the PC drum 206. The beam pit correction device is described more in detail. The beam pitch correction device may rotate or incline one or all of the first and second light source sections 14 and 24, and the light source apparatus 1 almost around the light axis. Such a beam pitch correction device is also realized with a simple configuration.

The first light source section 14 is supported while the base member 13 including the cylindrical lens supporting section 15 installing the semi-conductor laser diodes 11a and 11b is pressure inserted to the attaching hole 31a as described earlier. The second light source section 24 is similarly supported while the cylindrical lens supporting section 25 is pressure inserted to the attaching hole 31b. Further, the base members 13 and 23 respectively include projections 16 and 26, and the holder member 31 also includes a projection 36. Accordingly, by pushing either the projection 16 or 26 with a pushing device such as a stepping motor, either the first or second light source section 14 or 24 are rotated almost around the lens holding section 15 or 25.

In addition, when pushing the projection 36, both first and second light source section 14 and 24 rotate or incline together with the holder member 31. Because the semi-conductor laser diodes 11a and 11b irradiating light beams are fixed to the first light source section 14, the first light source section 14 rotates around a rotational axis almost parallel to the light axis 18. Then, because the beam spots 17a and 17b rotate around the virtual center C1, an interval between the beam spots 17a and 17b in the sub scanning direction is changed and a beam pitch can be corrected and adjusted. Similarly, because the semi-conductor laser diodes 21a and 21b are fixed to the second light source section 24, the second light source section 24 rotates around a rotational axis almost parallel to the light axis 28. Then, the beam spots 27a and 27b rotate around the virtual center C2, and a beam pitch can be corrected and adjusted.

In addition, because the first and second light source sections 14 and 24 are fixed to the light source apparatus 1, when the holder member 31 is rotated in the above-described manner, the light source apparatus 1 rotates around the rotation axis almost parallel to the light axis 18 or 28, and the center positions C1 and C2 change. Accordingly, a beam pitch can be corrected and adjusted. In such a situation, a changing manner of the beam spot arrangement on the PC drum sometimes varies in accordance with a difference of material, an assembling manner of the light source apparatus 1, and an environment change or the like. Thus, in a particular case, only any one of the first and second light source sections 14 and 24, and the light source apparatus 1 can be rotated and other one or two can not be rotated.

Figure 4:
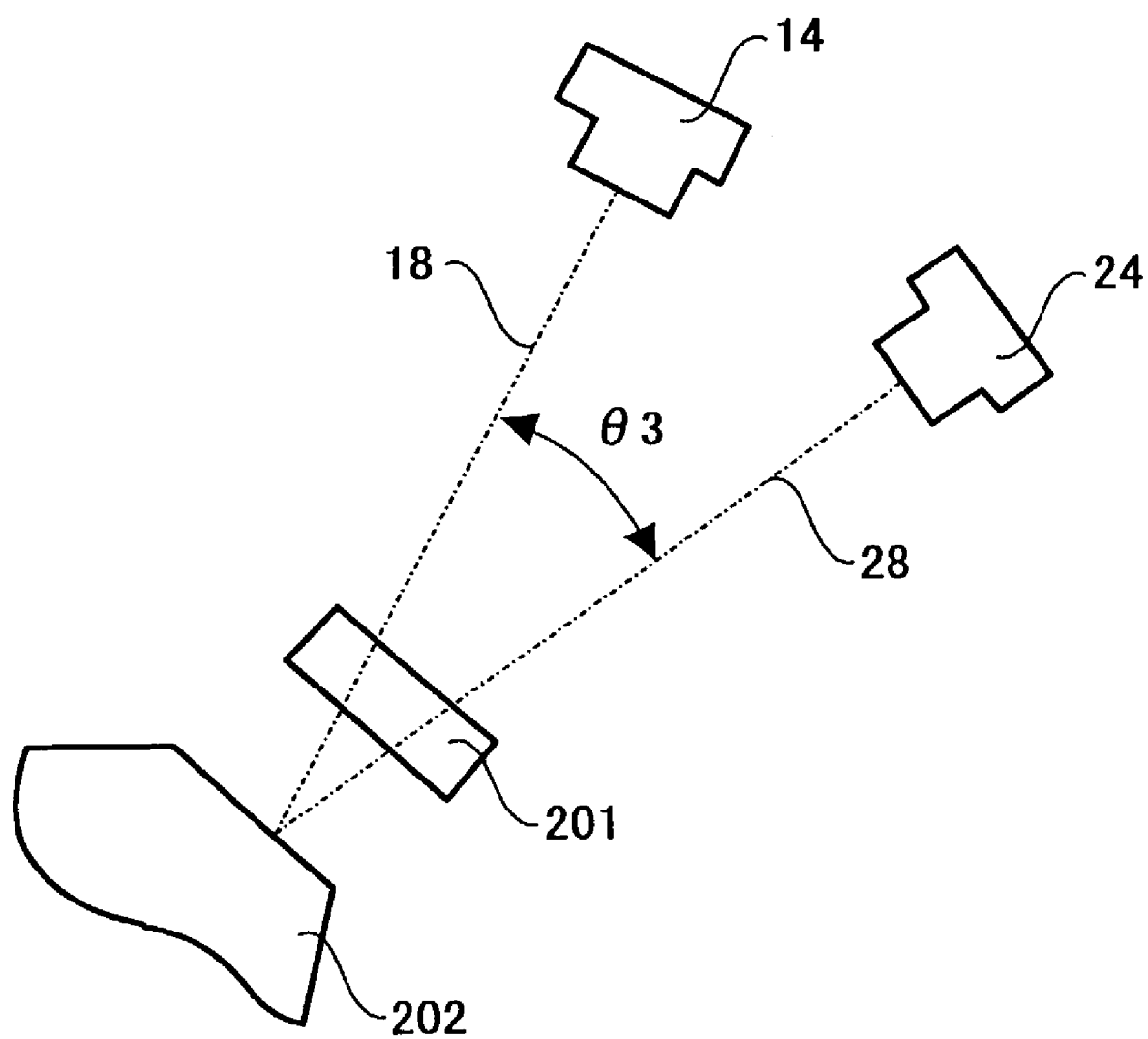
FIG. 4 is a model chart illustrating first and second light source sections and laser beams respectively irradiated from those sections.
Figure 9:
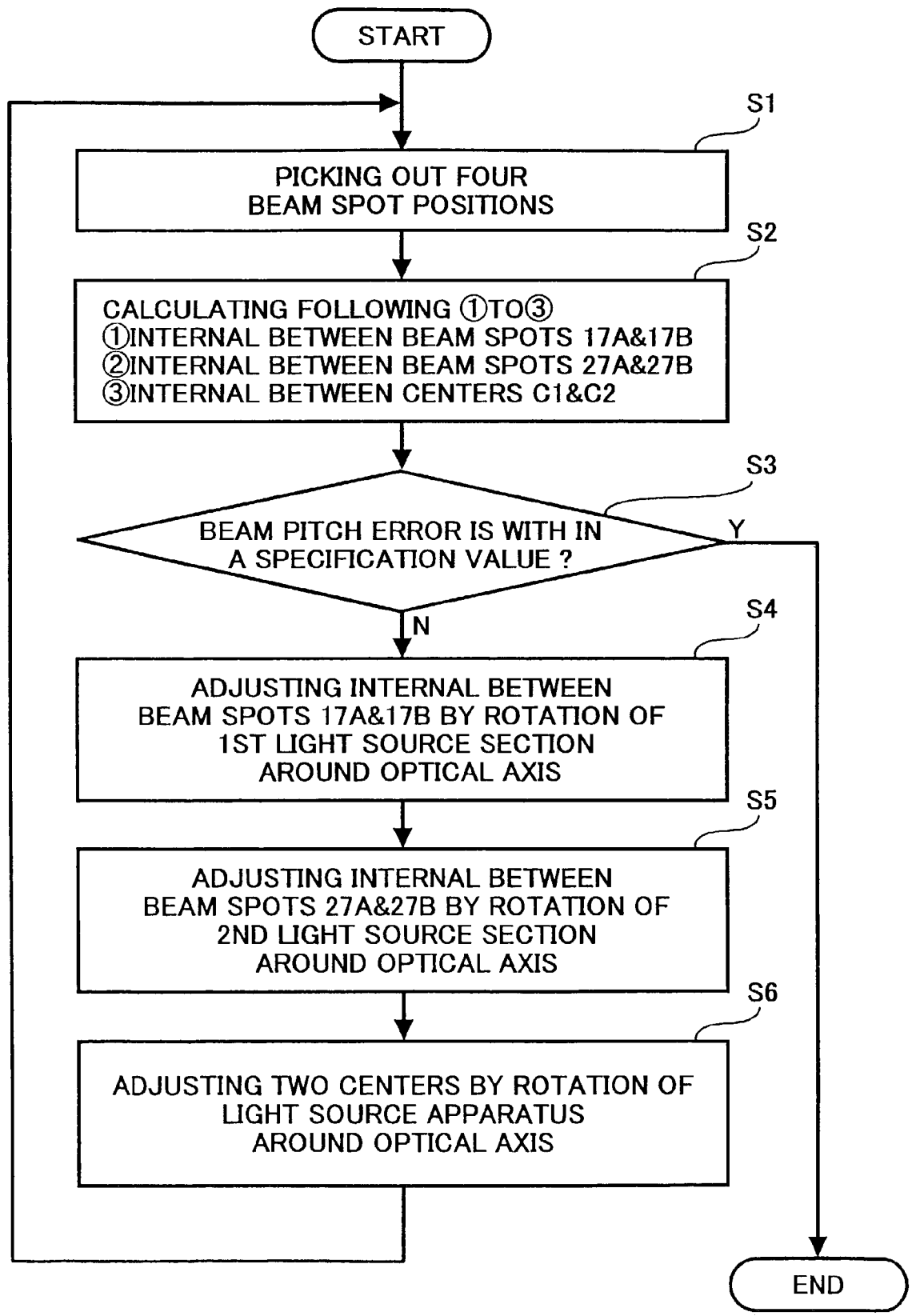
FIG. 9 is a flowchart illustrating one example of a procedure of correcting a beam pitch with a beam pitch correcting device.

Further, as illustrated in FIGS. 3 and 4, in view of a configuration of the light source apparatus 1, an angle θ1 made by the two beams irradiated from the semi-conductor laser diodes 11a and 11b of the first light source section 14 and intersecting at a position in the vicinity of a deviation reflection surface of the polygon mirror 202 is almost the same to that of η2 made by the two beams irradiated from the semi-conductor laser diodes 22a and 22b of the second light source section 24 and intersecting at a position (θ1≈θ2). In contrast, the angle of θ3 made by the light axis 18 and 28 is large (FIG. 4). Accordingly, correction of a beam pitch is preferably be performed in accordance with a procedure illustrated in a flowchart of FIG. 9.

Specifically, when a process starts, step S1 is performed. Information specifying four beam spots 17a, 17b, 27a, and 27b is input from the beam pitch detection section 7 to the control section 57. The process goes to step S2, and the control section 57 calculates intervals between respective beam spots 17a and 17b, and 27a and 27b, and centers C1 and C2. Subsequently, the process goes to step S3, and whether or not beam pitch error is within a prescribed specification value is determined from a value obtained in step S2. If it is within the prescribed specification value, the process is completed. If it is without the prescribed specification value, the process goes to step S4. Then, the interval between the beam spots 17a and 17b is adjusted by operating the above-described beam pitch correction device, in particular, by rotating the first light source section 14. In the subsequent step S5, the interval between the beam spots 27a and 27b is adjusted by rotating the second light source section 24. Further, in the subsequent step S6, the interval between the centers C1 and C2 is adjusted by rotating the above-described light source apparatus 1. Then, the process returns to step S1 and steps from S1 to S3 may be repeated.

Such a changing value Δp of a pitch between two beams on the PC drum 206 can be obtained by the following formula:

$$\Delta p = 2 \times fcol \times \tan(\theta/2) \times \sin \gamma \times m$$

where γ represents respective rotational angles of the first and second light source sections 14 and 24, and the light source apparatus, which is necessary for adjusting a beam pitch.

Since the angle of θ3 is sufficiently larger than the angles θ1 and θ2 formed by intersecting light beams as described above, when a changing rate (sensitivity) per the rotational angle γ is considered, a changing rate of the interval between the centers C1 and C2 is greater than that of the various intervals between the beam spots 17a and 17b, and 27a and 27b. Accordingly, the four beam pitches may be readily shortly adjusted when the centers C1 and C2 is adjusted by rotation of the light source apparatus after adjusting the intervals between respective those beam spots 17a and 17b, and 27a and 27b.

Figure 10:
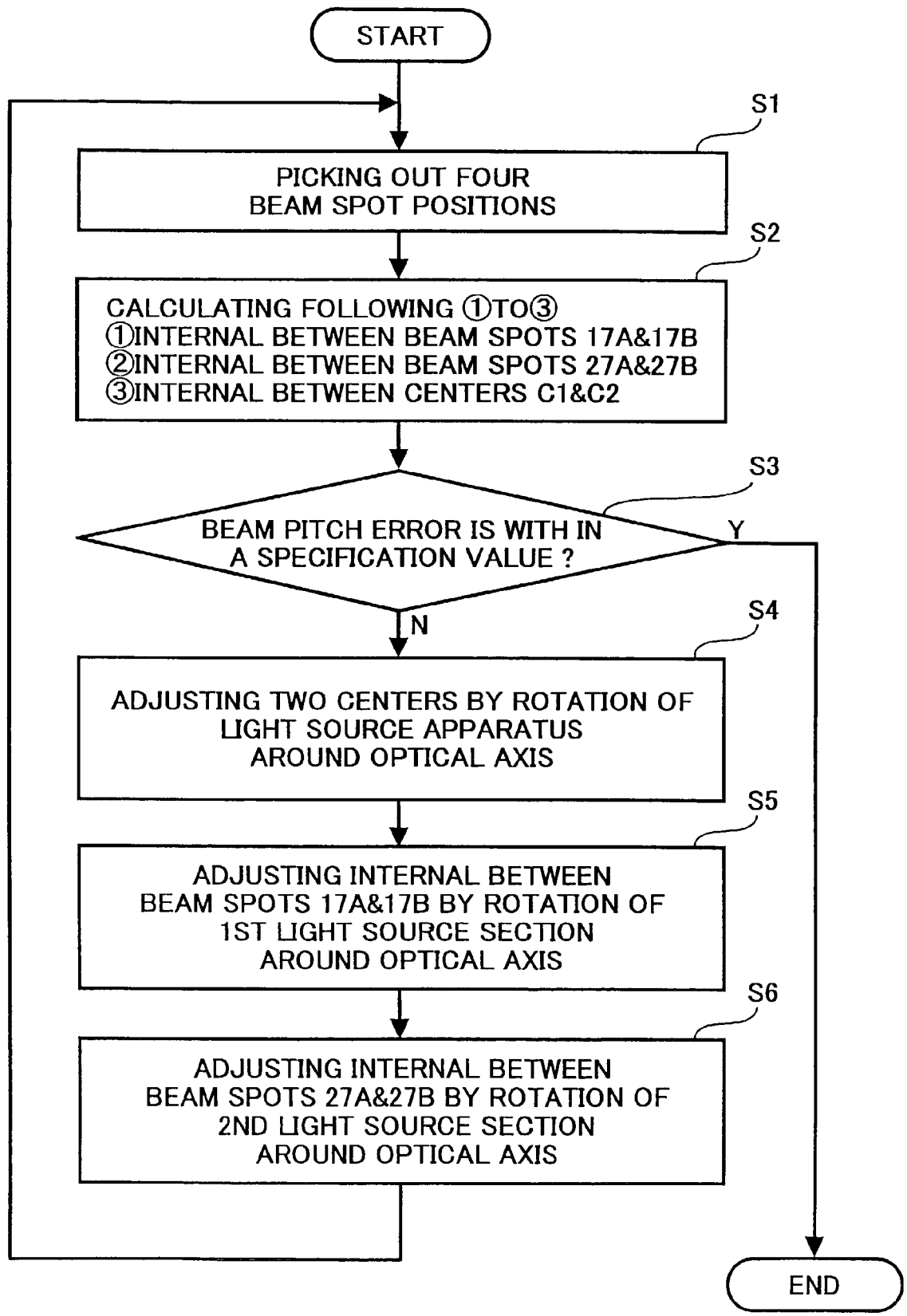
FIG. 10 is a flowchart illustrating another exemplary procedure.

Typically, when an angle formed by two intersecting light beams in the vicinity of the deviation reflection surface of the polygon mirror is large, a difference in affection of sag (i.e., reflection point displacement) to the two light beams on the deviation reflection surface is also large, and accordingly, the deviation of a beam property, such as a beam spot radius, and a main scanning direction magnification rate on the PC drum 206 is large. In the above-described configuration, the angle θ3 may occasionally be too large in relation to a property of the Fθ lens or the like. In such a situation, like the light source apparatus 1, two light beams from the first light source section 14 are preferably approximated and combined to a light beam irradiated from the second light source section 24, and is then output by a function of the beam combining prism 32. If designed in such a manner, the angle of θ3 is smaller than those of θ1 and θ2. In such a situation, to correct changes in pitches of the four beams, a process of FIG. 10 is preferably followed. Specifically, when its process starts and steps S1, S2, and S3 are performed in a similar manner to that described above, the process goes to step S6 and substantially the same operation as described above is performed. After that, steps S4 and S5 are performed. Specifically, an order of the steps S4, S5 and S6 of FIG. 10 is different from those performed in FIG. 9.

Figure 8:
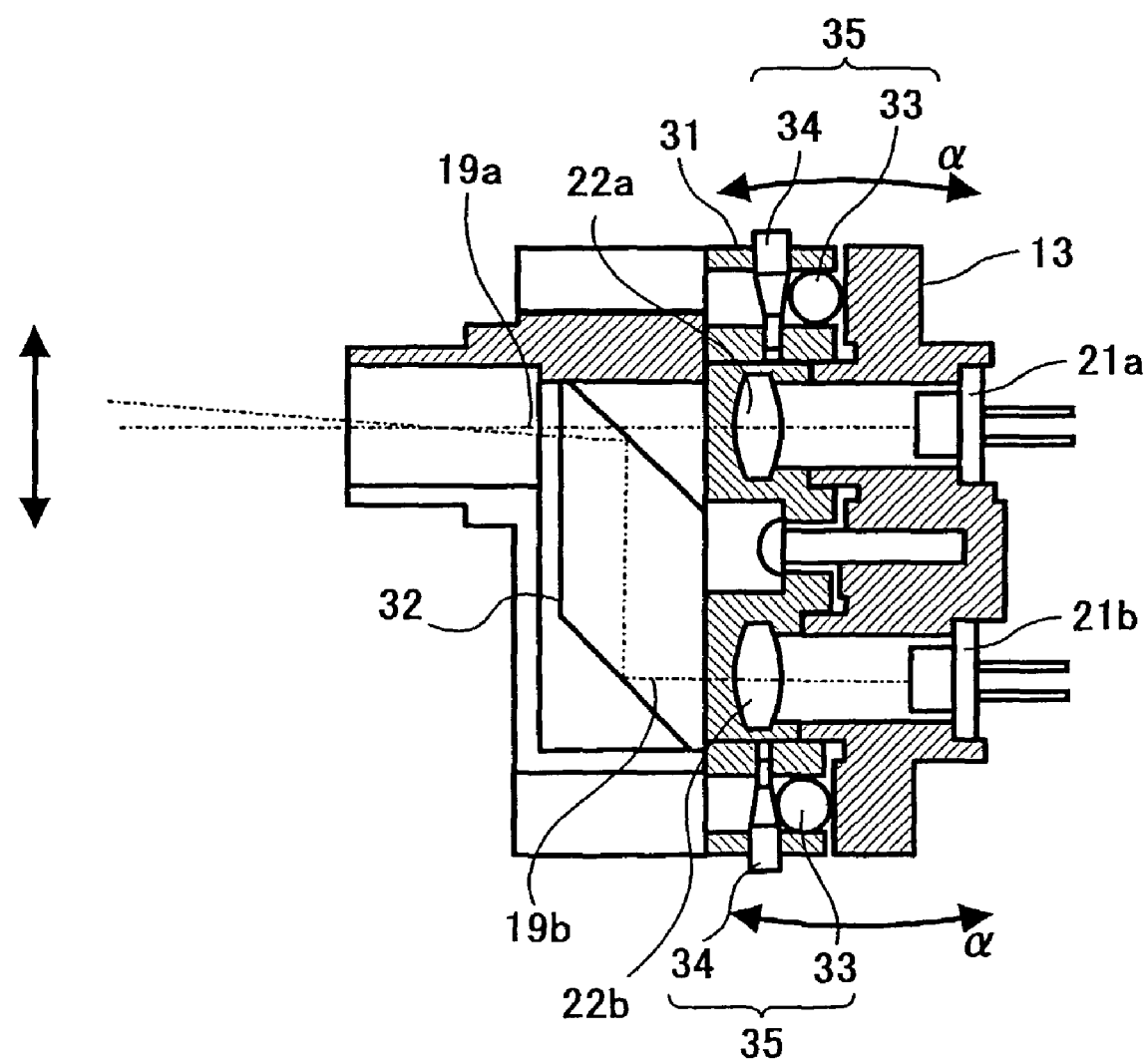
FIG. 8 is a vertical cross sectional view along a sub scanning direction plane of the multi-beam light source apparatus employing a posture changing section.

Further, the optical scanning apparatus 100 can use a device for either rotating or inclining at least one of the first and second light source sections 14 and 24 on the sub scanning direction cross sectional plane as a beam pitch-correcting device. As a result, a degree of freedom of designing an optical scanning apparatus can be increased. For example, a posture changing section 35 may be used either in the first or second light source section as illustrated in FIG. 8.

The posture changing section 35 is formed by a position adjusting screw 34 having a tapered portion and mounted on the holder member 31, and a ball 33 movable in back and forth directions (a) by the position adjusting screw 34. The posture changing section 35 accordingly moves the ball 33 both in the back and forth directions (a) by either screwing or loosening adjusting screw 34 up and down. Because the base member 13 engages and moves back and forth (a) when the ball 33 moves in the back and forth direction (a), posture of either the first or second light source section 14 or 24 can be changed. Thus, any one of the first and second light source sections 14 and 24 can tilt on the sub scanning direction cross sectional plane.

In addition, the position adjusting screw 34 can be manually screwed or loosened, or is rotated by a stepping motor (not shown). In any manner, by operating the posture changing section 35 serving as the beam pitch correction device, a change in a beam pitch can be corrected. In addition, the correction of the change of the beam pitch can automatically be performed without labor of an operator when the latter manner is employed.

Further, the beam pitch correction device can employ a piezoelectric element or similar devices as a pushing device for directly pushing either the first or second light source sections 14 or 24 beside the posture changing section 35. Because a relative deviation of the light axis 18 in relation to the light axis 28 can be caused by either rotating or inclining the first light source section 14 using the above-described beam pitch correction device on the sub scanning direction cross sectional plane, an interval between centers C1 and C2 on the surface of the PC drum 206 in the sub scanning direction can be adjusted. In such a situation, since the light axis 18 or 28 from either the first or second light source section 14 or 24 is directly changed, a correction value per a unit angle (i.e., sensitivity) may relatively be increased when compared with a case in which correction is performed by pushing either a projection 18 or 28 of the first or second light source section 14 or 24 and rotating them around light axis as described earlier. Accordingly, the beam pitch adjustment operation is preferably performed pursuant to the flowchart of FIG. 9.

Further, in an image forming apparatus at least including a PC member bearing a latent image formed by an electro-photographic process, a developing device for visualizing the latent image with toner, and transfer and fixing devices for transferring and fixing the visualized toner image on a recording sheet, each process generally generates heat and vibration, and those affection possibly approach an optical scanning apparatus. This is similarly applicable to the optical scanning apparatus 100. Because the optical scanning apparatus 100 employs the above-described beam pitch detection device and beam pitch correction device, a change in a beam pitch on the PC drum 206, which is caused by a change in environment such as temperature increase or vibration of the image forming apparatus or a time elapse, can be efficiently corrected when the optical scanning apparatus 100 is used in the optical writing apparatus of the image forming apparatus. In such a color image forming apparatus, due to availability of correction, a high quality output image can be obtained.

Figure 14A:
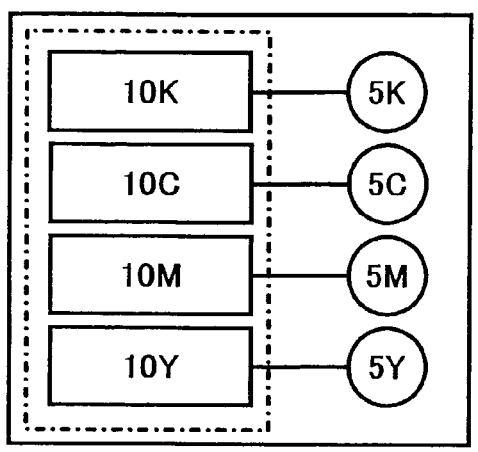
FIG. 14A is a block chart illustrating a configuration of various optical scanning apparatuses separated in accordance with respective colors and included in an image forming apparatus that forms a color image.
Figure 14B:
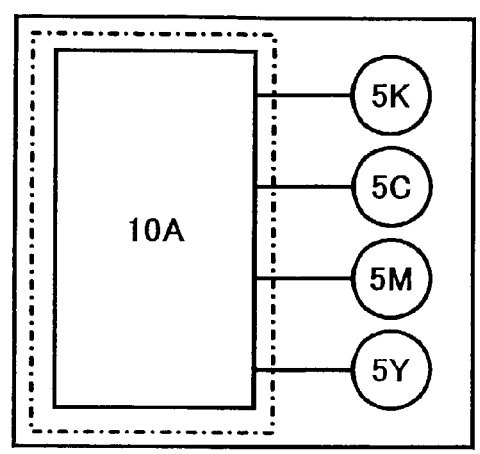
FIG. 14B is also a block chart illustrating a configuration of various optical scanning apparatuses integrated into a common body for respective colors and included in a color image forming apparatus that forms a color image.
Figure 14C:
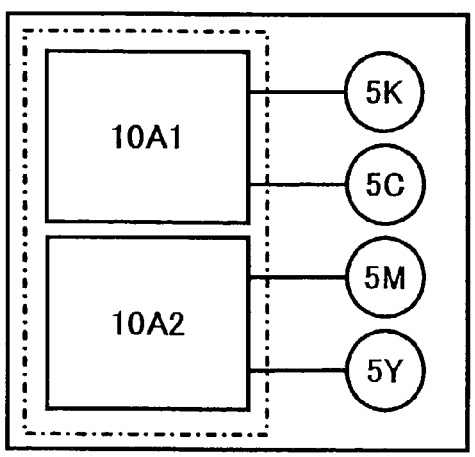
FIG. 14C is also a block chart illustrating a configuration of various optical scanning apparatuses divided into two bodies, and included in a color image forming apparatus that forms a color image.
Figure 14D:
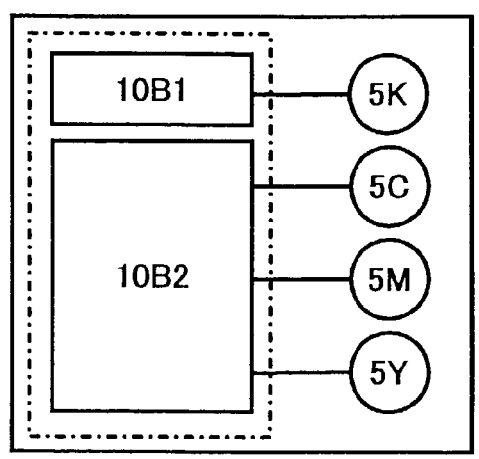
FIG. 14D is also a block chart illustrating a configuration of various optical scanning apparatuses of a color image forming apparatus that forms a color image, when the optical scanning apparatuses are divided into two bodies in a different manner from that of the Fig. 14D.

Further, there exists a color (multi-color) image forming apparatus amongst image forming apparatuses that form images using electro-photographic systems. In such an image forming apparatus, an image formation process is repeated per a color so as to obtain a color toner image. Specifically, it frequently includes an independent developing unit including black (K), yellow (Y), cyan (C), and Magenta (M) colors, and photosensitive members such as PC drums arranged in a sheet feeding direction in tandem in accordance with the respective developing units. On the other hand, as illustrated in FIG. 14(A), optical scanning apparatuses 10K, 10C, 10M, and 10Y can be separately equipped in accordance with the respective colors. Otherwise, those can be made into a common optical scanning apparatus 10A as illustrated in FIG. 14(B). Still otherwise, those can be made into two body unit optical scanning apparatuses 10A1 and 10A2, and 10B1 and 10B2 as illustrated in FIGS. 14(C) and 14(D). In any way, four times of a number of output images can be obtained when compared when only one PC drum type image forming apparatus requiring four times of writing for four colors is utilized.

When light source apparatuses 1K, 1C, 1M, and 1Y are utilized in accordance with the respective colors, and a number of beams irradiated therefrom is single, a full color (four colors) image can be obtained by an image forming apparatus using respective light source apparatuses. In contrast, when the above-described configuration of the four beam light source apparatus 1 is used only in one of four light source apparatuses (e.g. a light source apparatus 1K for black (K)), and only performs writing, writing density can be increased to that of four times. As a result, writing can be performed at high speed, because a number of beams is four times of a case when a full color image is formed. Further, even if a sheet feeding and process speeds are changed to a level of four times, a number of sheets bearing images can be increased. Even in the full color image forming apparatus, a character image is frequently formed using a black color, and generally requires high resolution. In such a situation, if the light source apparatuses (1C, 1M, 1Y of one beam) simultaneously write together with the light source apparatus 1K, a high quality output image including characters, pictures, line images or the like can be obtained.

Figure 12:
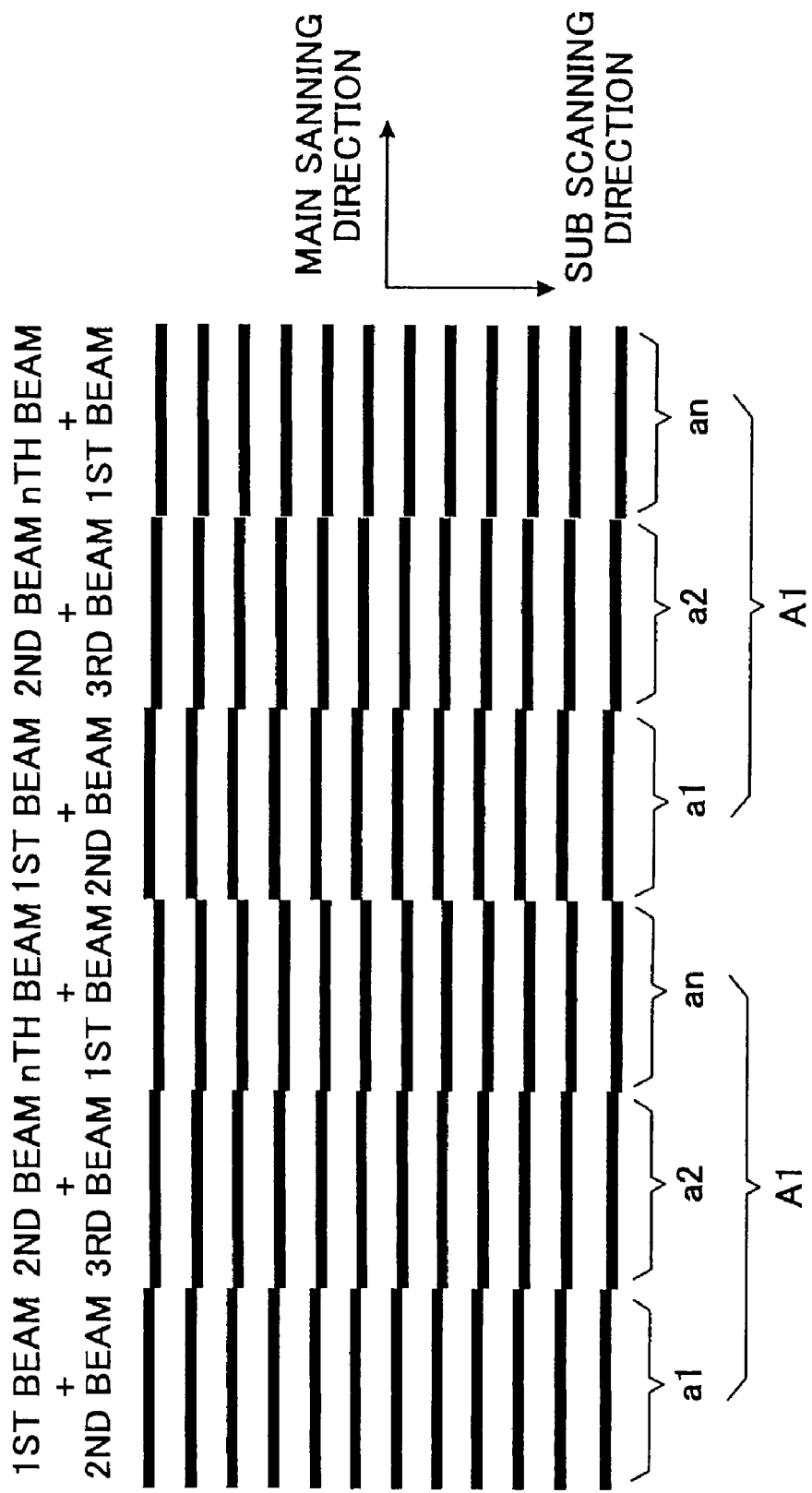
FIG. 12 is an explanatory chart illustrating an evaluation chart output from an image forming apparatus according to the present invention.

Further, when an operator (e.g., a service person, a user or the like) operates and inputs through an operation panel such as a liquid crystal display panel provided on the image forming apparatus, an image having an evaluation chart or the like enabling the operator to evaluate a beam pitch can be output therefrom. Then, an appropriate countermeasure can be taken at a user side installing the image forming apparatus without moving the body thereof. Specifically, based upon the output image, the operator can manually operate the beam pitch correction device and correct the beam pitch. Thus, the counter measure can be readily taken at the user side. In such a situation, as a pattern of an output image, a plurality of image pattern bands A1 each composed of image patterns a1, a2, . . . , an, can be arranged adjacently in parallel to the sub scanning direction as illustrated in FIG. 12.

The image pattern band A1 includes an image pattern a1, in which two dot lines formed by the first and second light beams on the PC drum in the main scanning direction, and that repeats the sub scanning direction at a frequency of integer times of a number of light beams irradiated from the light source apparatuses. Also included is an image pattern a2, in which two dot lines formed by the second and third light beams on the PC drum in the main scanning direction, and that repeats in the sub scanning direction at a frequency of integer times of the number of the light beams irradiated from the light source apparatuses. Also included is image patterns, in which two dot lines formed by the n-th and first light beams on the PC drum in the main scanning direction, and that repeat in the sub scanning direction at a frequency of integer times of a number ("N") of light beams from the light source apparatuses.

Further, with a configuration enabling the operator to confirm an image quality from the evaluation chart, deterioration of an output image can be corrected while considering not only the effect of a change in a beam pitch in an optical scanning apparatus 100, but also that of respective processes such as developing, transferring, and fixing to the output image. Furthermore, because the operator can inspect a change in a beam pitch when confirming the image quality from the evaluation chart, one or the entire pitch detection device and pitch control devices can be omitted. As a result, the optical scanning apparatus can be manufactured at reduced cost.

Figure 15:
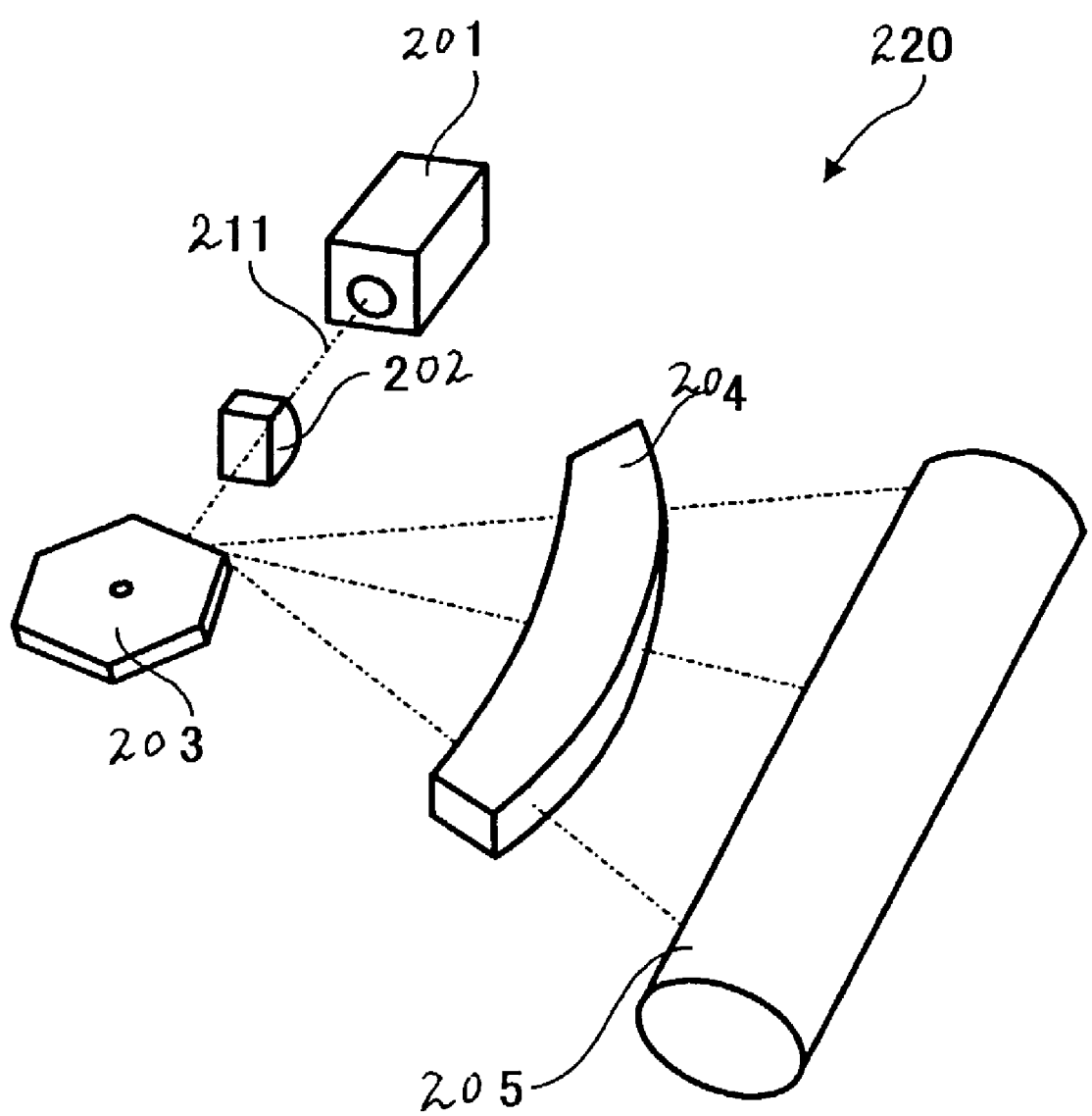
FIG. 15 is a perspective view illustrating optical arrangement of an optical scanning apparatus.

Another embodiment is now described with reference to FIGS. 15 to 30. FIG. 15 is a perspective view illustrating a second embodiment of optical arrangement of an optical scanning apparatus according to the present invention. The numeral number 220 denotes the optical scanning apparatus capable of scanning a scan-receiving surface with a beam spot of a light beam irradiated from the light source apparatus. In addition, the respective main and sub scanning directions represent directions in which a beam spot is scanned and perpendicular to the scan-receiving surface, respectively. In the specification, directions at positions on a light path corresponding to the main and sub scanning directions are also termed as main and sub scanning directions as wide range meaning. In each of drawings, numerals X, Y, and Z represent directions along the light path (light axis), a main scanning direction, and a sub scanning direction, respectively.

The numeral 201 represents a light source apparatus, the numeral 202 represents a cylindrical lens, and the numeral 203 represents a deviation device (e.g. a polygon mirror). The numeral 204 represents a scan imaging optical unit (e.g. a scanning lens), and the numeral 205 represents a scan-receiving surface (e.g. a PC drum). A plurality of light beams 211 irradiated from the light source apparatus 201 are imaged on a surface of a polygon mirror 203 serving as a deviation device by a function of the cylindrical lens 202 in a state of a long line image imaged in the sub scanning direction and extending in the main scanning direction. The long line image is then scanned via the scan imaging optical unit 204 to the scan receiving surface 205 in a state of a beam spot. The plurality of the beam spots on the scan receiving surface 205 is required to maintain prescribed interval (i.e., a beam pitch) in accordance with its scanning density. To set such a beam pitch, an angle φ formed by beams 211a and 211b illustrated in FIG. 16 is preferably set.

Figure 16:
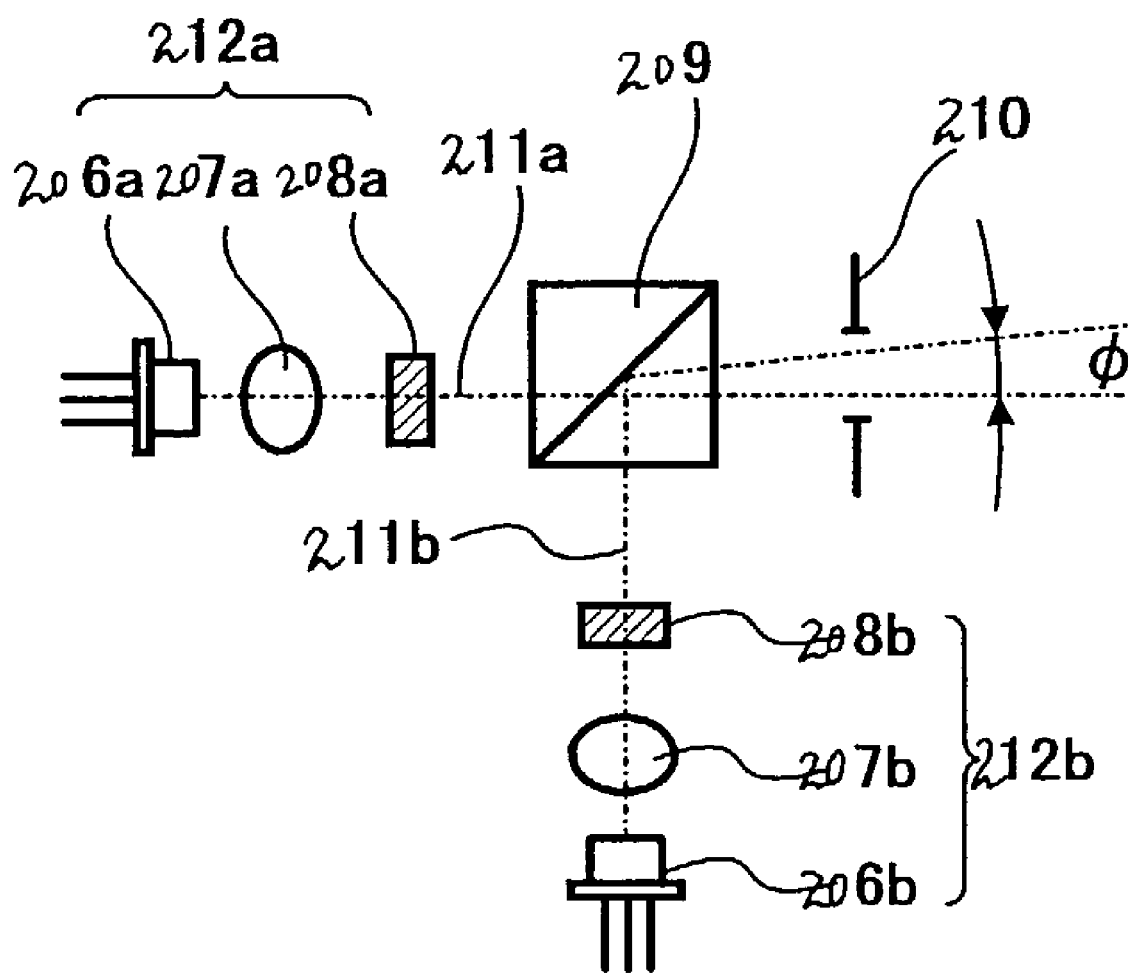
FIG. 16 is a chart illustrating optical arrangement on a sub scanning direction cross sectional plane of the light source apparatus included in the optical scanning apparatus of Fig. 15.

FIG. 16 is a chart illustrating optical arrangement of the light source apparatus 201 on a sub-scanning direction cross sectional plane. In this specification, an apparatus constituted by at least two light source modules and irradiates light beams is termed as a light source apparatus. The numeral numbers 206a and 206b are semi-conductor laser diodes, the numeral numbers 207a and 207b are coupling lenses, and the numeral numbers 208a and 208b are beam ejection direction changing devices. The numeral number 209 is a beam-combining device (e.g. a prism), the numeral number 210 is an aperture, and the numeral numbers 211a and 211b are light beams.

A pair of light beams 211a and 211b irradiated from light source modules 212a and 212b, constituted by the semiconductor laser 206a and 206b, and the corresponding coupling lenses 207a and 207b, respectively, transmits the beam ejection direction changing devices 208a and 208b, respectively. The pair of light beams 211a and 211b are then combined by the beam combining device 209 and faired by an aperture 210 in accordance with a property of the subsequent optical unit. The angle formed by the two light beams 211a and 211b is set at φ.

In the light source apparatus 201, the beam combining prism 209, the aperture 210, and two beam ejection direction changing devices 208a and 208b is provided in addition to the two light source modules 212a and 212b. However, the light source apparatus can be configured as either a detachable or non-detachable unit from the optical scanning apparatus. In addition, the light source modules 212a and 212b, the beam combining prism 209, the aperture 210, and beam ejection direction changing devices 208a and 208b may be integrally secured to a holding member (not shown) so as to conform the light source apparatus 201. However, the holding member can be either separated from or a part of a housing member or the like of the optical scanning apparatus 220.

FIG. 17 is a chart extending and illustrating a sub scanning direction cross section of a scanning optical unit. When the semi-conductor laser (e.g. a light emission point) 206 is displaced by a length of δ from an optical axis of the coupling lens 207 in the sub scanning direction, a positional displacement of Δz may arise on the scan receiving surface 205. If a sub scanning sideward magnification of the scan optical unit is "mZ", the positional displacement (i.e., a distance between a center line and a laser beam on the scan receiving surface in the sub scanning direction) Δz of the beam spot may be represented as follows (hereinafter referred to as formula 1):

$$\Delta z = mZ \times \delta$$

If a focal length of the coupling lens 207 is "fcol", and inclination of the ejection beam 211 on the sub scanning direction cross sectional plane is φ, the below described relation may be established:

$$\delta = fcol \times \tan\phi$$

Thus, the formula 1 may be converted as follows when φ is small enough (hereinafter referred to as Formula 2):

$$\Delta z = mZ \times fcol \times \tan\phi = mZ \times fcol \times \phi$$

Accordingly, by setting the angle φ and using Formula 2, a position of a beam spot on a scan receiving surface 205, and a beam pitch when a plurality of beams is used can be set.

Figure 18A:
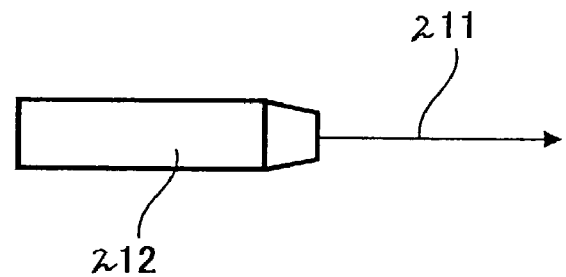
FIGS. 18A, 18B, and 18C are charts illustrating exemplary configurations of light source modules.
Figure 18B:
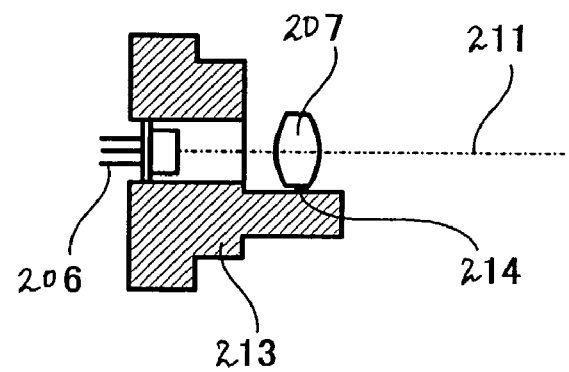
Figure 18C:
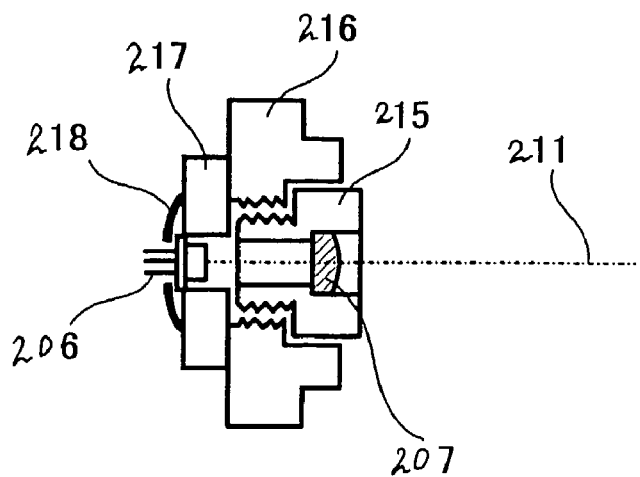

FIGS. 18A, 18B, and 18C illustrate exemplary light source modulates 212. In the drawing, the numeral number 213 is a lens holder, the numeral number 214 is adhesive agent, and the numeral number 215 is a lens cell. The numeral number 216 is a lens holder, the numeral number 217 is a base member, and the numeral number 218 is a cover.

FIG. 18A is a chart for illustrating a function of the light source module 212. However, any configuration can be used as far as a module has a function of irradiating a light beam. In FIG. 18B, the semi-conductor laser 206 is secured to the lens holder 213 by a manufacturing manner such as pressure insertion. Adhesive agent 214 also secures the coupling lens 207 or the like. Positioning of the semiconductor laser 206 and coupling lens 207 may be performed by adjusting a position of the coupling lens 207 in accordance with a property of a subsequent optical unit so that a light axis direction and collimating performance of the ejection beam 211 can be prescribed values.

In FIG. 18C, the semiconductor laser diode 206 is secured to the cover 218 of the base member 217. The coupling lens 207 is secured to the lens cell 215 having a male screw portion with adhesive agent or the like. The base member 217 and lens cell 215 is secured to the common lens holder 216 so that a relative positional relation between the semiconductor laser 206 and coupling lens 207 can be a prescribed level. The base member 217 with the semiconductor laser 206 may move up and down in the drawing and in a direction perpendicular to the drawing. The lens cell 215 with the coupling lens 207 moves in right and left directions in the drawing. As a result, a relative positional relation between the semi-conductor laser 206 and coupling lens 207 can be adjusted.

In addition, the above-described semiconductor laser diode 206 can be either a single or multi-beam laser beam diode irradiating a single or plurality of laser lights, respectively.

When the above-described optical scanning apparatus 220 is assembled in an assembling factory or the like, a beam pitch between a plurality of beams on a scan receiving surface 205 should be initially adjusted to a prescribed level. However, owing to various affection of assembling adjustment error of the light source module 212 (i.e., error in positioning a semi-conductor laser 206 and a coupling lens 207), building error of the light source module 212 into a holding member, and light axis deviation in a beam combining prism 209, the angle φ sometimes largely deviates from the prescribed setting value, and the beam pitch on the scan receiving surface 205 sometimes can not be initially adjusted to a prescribed level.

In such a situation, the beam pitch should be adjusted to the prescribed level by adjusting the angle φ with the beam ejection direction changing devices 208a and 208b. In addition, due to a change in environment and elapse of time during usage by a user after shipping, an initial adjustment value of a beam pitch possibly varies. Even in such a situation, the varied beam pitch can be corrected using the beam ejection direction changing devices 208a and 208b.

However, sometimes there exists a large difference in an adjustment value (i.e., a necessary adjustment stroke and limit of resolution) between instances when an initial adjustment is performed and when a beam pitch variation caused during the usage by the user due to a change in environment is corrected. Thus, a single or substantially the same configuration plural beam ejection direction changing devices hardly simultaneously achieve the above-described two types of adjustment values.

Such a problem is now described with reference to an exemplary optical scanning apparatus whose coupling lens 207 has a focal length (fcol) of 15 mm and the entire scanning optical unit has a sub scanning sideward magnification (mZ) of 5.3. Regarding the former adjustment value (A), experience shows that a deviation value $\Delta\phi A$ from the set (reference) value of the angle $\phi$ may be about 20' (i.e., 5.8 mrad) at most by the above-described cases. When that is converted into a beam pitch-displacing amount, the following formula may be established referring to the above-described Formula 2:

$$\Delta z = 5.3 \times 15 \times 0.0058 = 0.461 \text{ mm} = 461 \text{ μm}$$

Regarding the latter adjustment value (B), experience shows that a beam pitch changing value $\Delta z$ due to a change in environment or the like may be about 10 μm (=0.01 mm) at most. When that is converted into a deviation value $\Delta\phi B$ of the beam ejection light axis, the following formula may be established referring to the above-described Formula 2:

$$\Delta\phi B = \Delta z/(mZ \times fcol) = 0.01/(5.3 \times 15) = 0.000126[\text{rad}] = 0.126[\text{mrad}]$$

Accordingly, a ratio of the adjustment values $\Delta\phi A$ to $\Delta\phi B$ ($\Delta\phi A/\Delta\phi B$) may amount to 46, and it can be understood that both adjustment may be difficult to simultaneously be performed by the single or same configuration plurality of beam ejection direction changing devices.

Now, both beam pitch initial adjustment and feedback adjustment are described with reference to FIGS. 19A to 19C, which are charts illustrating exemplary arrangement of beams spots Bs on a scan receiving surface 205 (e.g., 1200 dpi when a two-beam scanning apparatus is utilized).

Figure 19A:
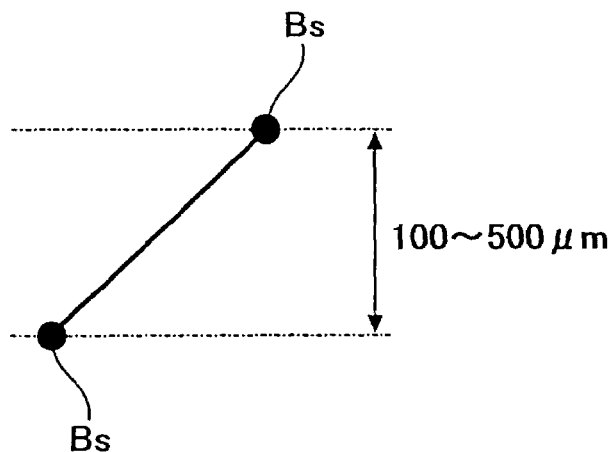
FIGS. 19A, 19B, and 19C are charts illustrating exemplary beam spot arrangement on scan-receiving surfaces.
Figure 19B:
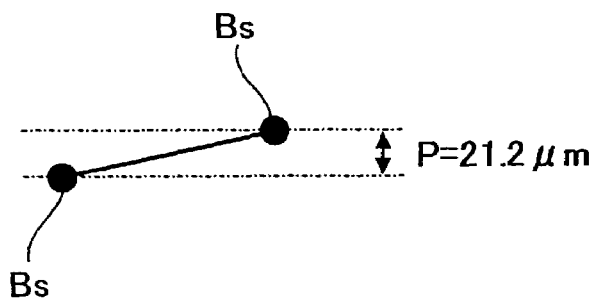

Due to error of the angle $\phi$ formed by the two light beams after beam combination (i.e., a positioning error of a semiconductor laser and coupling lens, building error of a light source module into a holding member, light axis deviation caused by that in a beam combining prism or the like), a beam pitch on the scan receiving surface 205 may amount to about 100 μm to 500 μm when an optical writing apparatus is assembled (i.e., before initial adjustment) as illustrated in FIG. 19A. When initially adjusting (i.e., roughly adjusting) a beam pitch to a prescribed level (e.g. 21.2 μm when scanning density is 1200 dpi as illustrated in FIG. 19B), a high sensitivity beam ejection direction changing device is preferably used.

Figure 19C:
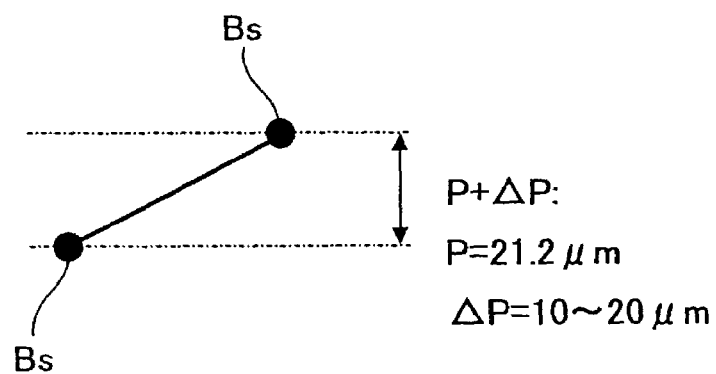

When the beam pitch changes by some value (e.g. $\Delta p$ is about 10~20 μm as illustrated in FIG. 19C) due to a temperature change or time elapse or the like, such a changing value may be detected and a feedback adjustment is preferably performed with a low sensitivity beam ejection direction changing device. In addition, when the high sensitivity beam direction changing device is used, resolution limit is thus insufficient and initial adjustment is accordingly impossible to be set to a prescribed level, the low sensitivity beam ejection direction changing device can accessorily be used for the initial adjustment.

As described above, even if two types of adjustment for the above-described A and B requiring different sensitivity can be readily performed by differentiating sensitivity of one of beam ejection direction changing devices 208a from that of another 208b, because the high adjustment sensitivity side may be used in initially adjustment for a beam pitch, and the low adjustment sensitivity side may be used when a beam pitch is corrected.

Although the beam ejection direction changing devices 208a and 208b of FIG. 16 are arranged in different light paths 211a and 211b, respectively, both can be arranged in either one of the paths.

In addition, by using a detection device for detecting a beam spot arrangement (i.e., beam pitch) on the scan receiving surface 205 in the optical scanning apparatus 220, a change in the beam pitch during usage of the user can be detected. The detection device may perform electrical detection using a photo-diode or the like. In addition, when the optical scanning apparatus 220 is used as an optical writing apparatus of the image forming apparatus, such detection can be performed using an output image. When the beam pitch is electrically detected by the photodiode or the like, an input signal enabling the beam ejection direction changing devices 208a and 208b to operate may be obtained by comparing and calculating with a target value based upon the detection signal.

By applying at least such a system to the low sensitivity side beam ejection direction-changing device, a change in a beam pitch can automatically be corrected (e.g. with feedback adjustment). Further, when detection is performed using the output image, a user or service person and so on may perform correction by inputting a prescribed signal through a scanning panel and similar devices provided on an image outputting apparatus. If such a feedback adjustment system is employed in the high sensitivity side beam ejection direction changing device, initial adjustment of a beam pitch performed when an optical scanning apparatus is assembled in a factory may also be automatically performed.

Subsequently, a configuration of the beam ejection direction-changing device is now described with reference to FIG. 20A, which is a chart illustrating an exemplary optical light source apparatus enabling a transmission type optical element arranged in a light path as a beam ejection direction-changing device to deviate. The numeral number 221 may be a triangle prism. An irradiation angle $\beta 1$ of a light beam passing through the triangle prism 221 having a small apex angle $\theta 1$ and whose internal refraction index is "n" may be changed to the amount as represented by the following formula:

$$\beta 1 = (n-1) \times \theta 1$$

Accordingly, by rotating the triangle prism 221 around a light axis of a light beam by the angle of $\gamma 1$ (FIG. 20B), a sub scanning direction component $\phi 1$ of an ejection beam may be changed by an amount as obtained by the following formula:

$$\phi 1 = \beta 1 \times \sin(\gamma 1) = (n-1) \times \theta 1 \times \sin(\gamma 1)$$

Then, an displacing amount $\Delta z$ of a beam spot on a scan receiving surface 5 in the sub scanning direction per an adjustment amount $\gamma 1$ may be obtained referring to Formula 2 as follows (formula 3):

$$\Delta z = mZ \times fcol \times \phi 1 = mZ \times fcol \times (n-1) \times \theta 1 \times \sin(\gamma 1)$$

For example, if "mZ" is 5.3, "fcol" is 15 mm, "n" is 1.5, and "θ1" is 1.5° (i.e., 0.02618 rad), the above-described Formula 3 is converted as follows (i.e., Formula 3-1):

$$\Delta z = 1.04 \times \sin(\gamma 1) \text{ mm}$$

Thus, by rotating the triangle prism 221 by an angle γ1 of from −90° to +90°, a beam spot position may be adjusted by precision of +/−1 mm.

Figure 23A:
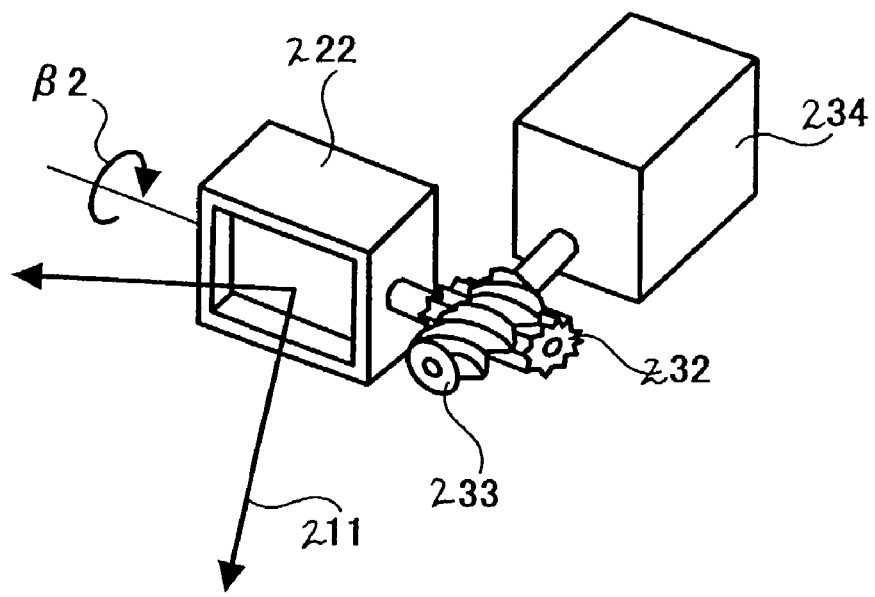
FIGS. 23A and 23B are charts for illustrating exemplary mechanisms for changing a beam ejection direction by a triangle prism.
Figure 23B:
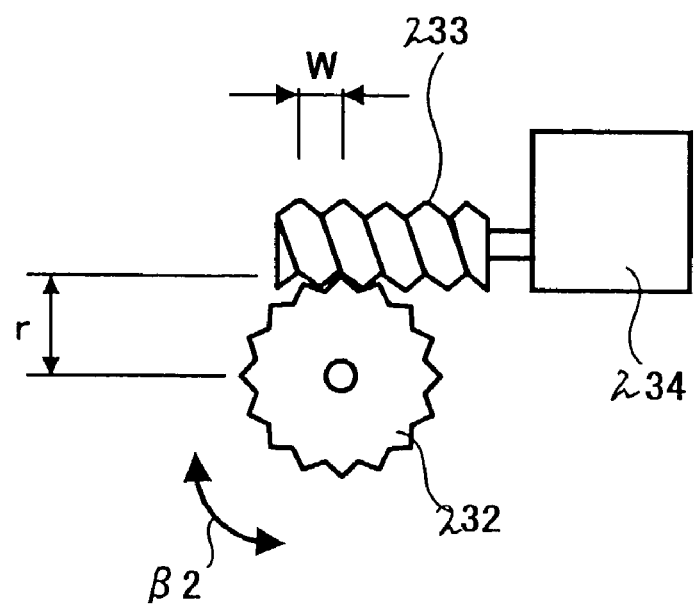

To rotate the triangle prism 221, a decelerating mechanism using a worm and wheel as illustrated in FIGS. 23A and 23B may be used, and wide range adjustment stroke and small adjustment limit, namely, a wide dynamic range adjustment mechanism may be achieved. As shown, a triangle prism 221 is held on a prism holder 222 that includes a gear (wheel 232) on its entire outer circumference, and is rotated by a worm 233 driven by a stepping motor 234 or the like.

If a reference step angle "s" of the stepping motor 234 is 18°, a worm pitch is 0.5 mm, a radius "r" of the wheel is 20 mm as illustrated in FIG. 23B, and a rotational angle of the triangle prism 221 per one step is Δγ1, the following formula may be established:

$$\sin(\Delta\gamma 1) = [(s/360°) \times w]/r = [(18°/360°) \times 0.5]/20 = 0.025/20 = 0.00125$$

Thus, the following formula may be established:

$$\Delta\gamma 1 = 0.0716° = 4.3'$$

If γ1 equals to Δγ1 in the above Formula 3-1, the following formula may be established:

$$\Delta z = 0.0013 \text{ mm} = 1.3 \text{ mm} = 1.3 \text{ μm}$$

As a result, adjustment may be performed at resolution limit Δz of 1.3 μm.

Since the worm and wheel are utilized, the triangle prism 221 is rotatable by 360°. Thus, an adjustable range may be ±1.04 mm when the above-described Formula 3-1 is referred to.

Figure 20A:
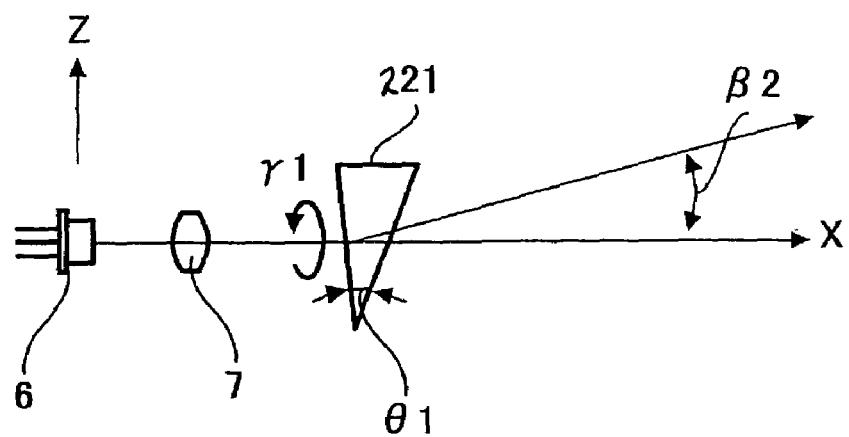
FIGS. 20A and 20B are charts illustrating exemplary configurations for deviating a transmission type optical element arranged in a light path as a beam ejection direction changing device.
Figure 20B:
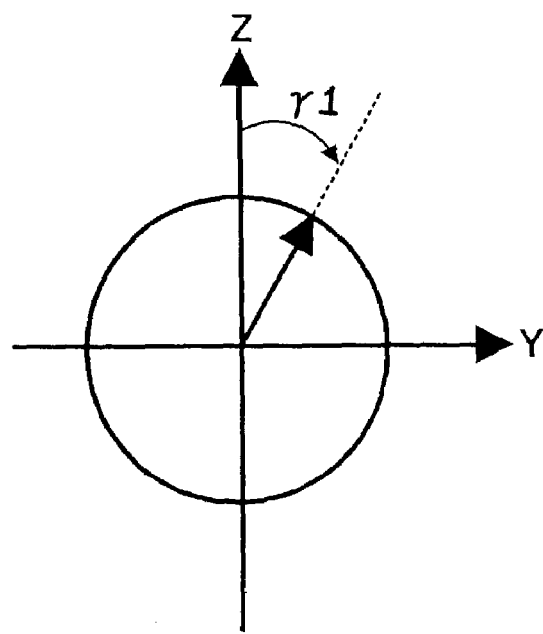
Figure 21:
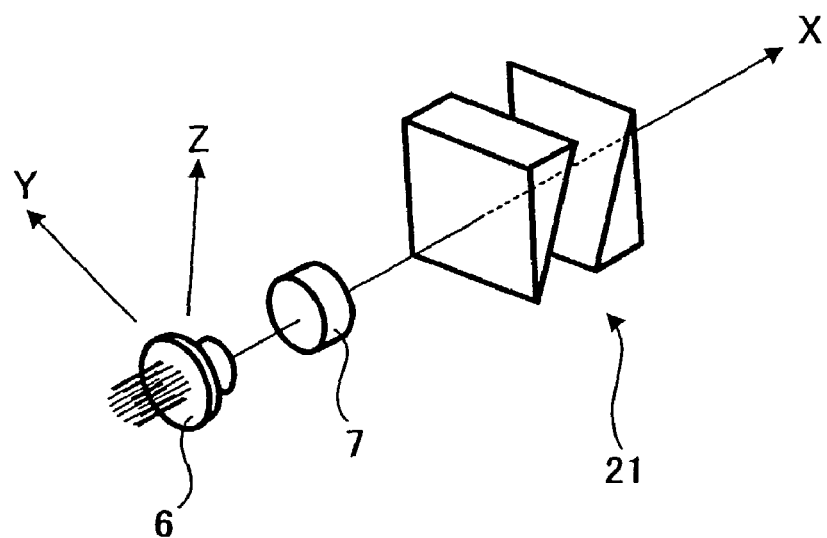
FIG. 21 is a chart illustrating an exemplary deceleration mechanism for decelerating a rotation speed of a triangle prism.
Figure 22:
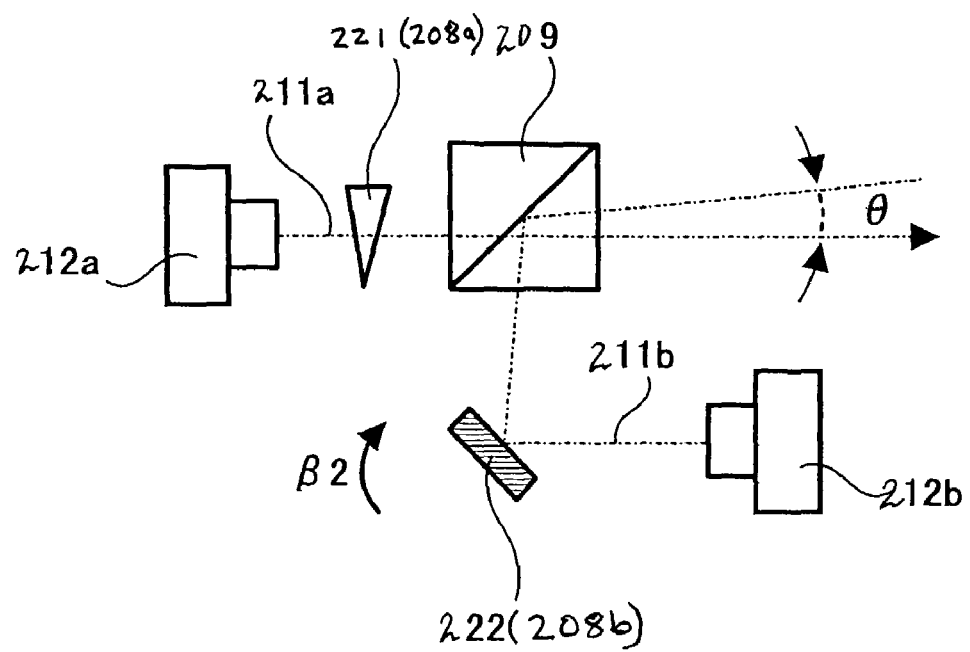
FIG. 22 is a chart illustrating an example capable of changing an angle of a light beam using two triangle prisms.

As illustrated in FIG. 20A, when only the single triangle prism 221 constitutes a beam ejection direction changing device, not only a sub scanning direction component but also a main scanning direction component of the ejection beam may as a result vary. To avoid the same, if two light triangle prisms 221 are serially arranged and are rotated in contrary directions as illustrated in FIG. 22, a light beam irradiation angle can be changed on a prescribed plane.

Another beam ejection direction-changing device configured to deviate a reflection type optical element disposed in a light path is now described with reference to FIG. 22. This example is configured such that the beam ejection direction changing devices 208a and 208b include respective triangle prism 221 (e.g., a transmission type optical element) and galvanometer mirror (i.e., a reflection type optical element) 222. In the beam ejection direction-changing device 208a (i.e., the triangle prism 221), considerations made for the above-described configuration may be applied thereto. In the beam ejection direction-changing device 208b, if an adjustment value (i.e., an arrangement angle) of the galvanometer mirror 222 is β2, the beam ejection direction of the light beam 211b can be changed by the following amount after reflection:

$$\phi 2 = 2 \times \beta 2$$

Accordingly, a displacing amount Δz of the beam spot on the scan receiving surface 205 in the sub scanning direction per the adjustment value β2 may be obtained from the Formula 2 as follows as a Fourth formula:

$$\Delta z = mZ \times fcol \times \phi 2 = mZ \times fcol \times 2 \times \beta 2$$

Now, in the beam ejection direction changing device 208b side, if a reference step angle "s" is 3.6°, a pitch "w" of the worm 233 is 0.3 mm, a radius "r" is 15 mm (i.e., mZ=5.3, fcol=15 mm), and a rotational angle of the galvanometer mirror 222 per a one step is Δβ2, the following formula may be established:

$$\sin(\Delta\beta 2) = [(s/360°) \times w]/r = [(3.6°/360°) \times 0.3]/15 = 0.0002$$

$$\Delta\beta 2 = 0.0115° = 0.68'$$

When "β2" equals to Δβ2 in the Formula 4, the following formula may be established:

$$\Delta z = 0.0318 \text{ mm} = 31.8 \text{ μm}$$

Thus, adjustment may be performed at resolution limit of 31.8 μm.

Then, initial adjustment of the beam pitch may be performed by the high sensitivity beam ejection direction changing device 208b side when assembling is performed in a factory. To correct a change in a beam pitch during user usage (preferably by performing feedback correction based upon a result of detection of a change in a beam pitch), the low sensitivity beam ejection direction-changing device 208a may be utilized. If the resolution limit 31.81 μm for the initial adjustment by the galvanometer mirror 222 side is insufficient, adjustment by the triangle prism 221 side is preferably joined.

Figure 24:
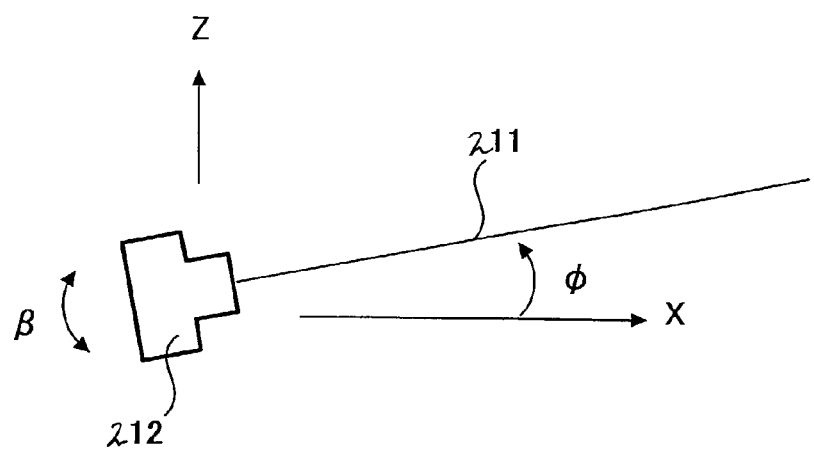
FIG. 24 is a chart illustrating an exemplary change in a beam ejection direction.

FIG. 24 illustrates still another beam ejection direction changing device. The device uses a configuration capable of changing an attaching posture of a light source module as another device for changing a beam irradiation direction. As illustrated in FIG. 24, the light source module 212 is preferably inclined on a sub scanning direction cross sectional plane (or on a plane having a sub scanning direction cross sectional component).

Figure 25A:
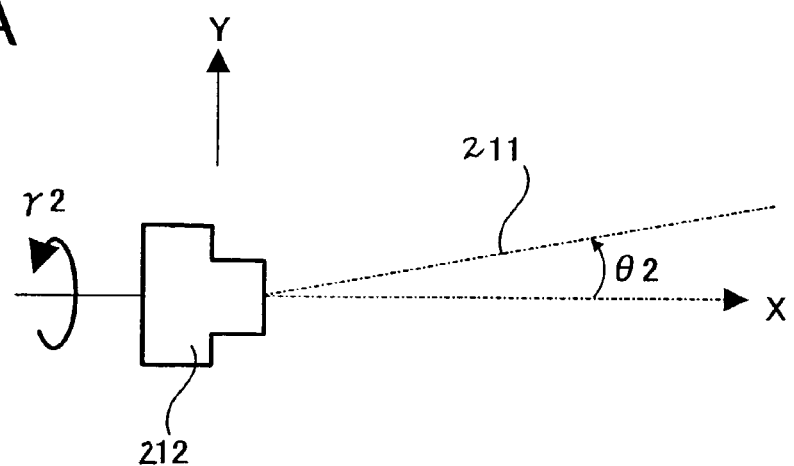
FIGS. 25A and 25B are charts illustrating another exemplary change in a beam ejection direction.
Figure 25B:
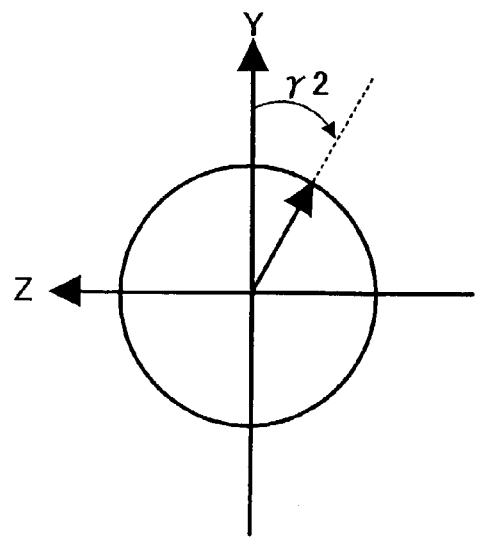

Otherwise, as illustrated in FIG. 25A, a sub scanning direction component of an ejection beam 211 can be changed by rotating the light source module 212 around a rotational axis "x" slightly deviated from the ejection beam 211. Now, when an angle formed by the rotational axis "x" of the light source module 112 and an ejection beam 111 is θ2, and a rotational angle of the light source module 212 is γ2 (FIG. 25B), a sub scanning direction component φ3 of the ejection beam may be represented as follows:

$$\phi 3 = \tan(\theta 2) \times \sin(\gamma 2)$$

Accordingly, a displacing amount Δz of the beam spot in the sub scanning direction on the scan receiving surface 205 with regard to the rotational angle γ2 of the light source module 212 may be obtained as follows from the formula 2:

$$\Delta z = mZ \times fcol \times \phi 3 = mZ \times fcol \times \tan(\theta 2) \times \sin(\gamma 2)$$

The beam ejection direction changing device uses a system capable of changing a relative position in a sub scanning direction between a semiconductor laser diode and a coupling lens when a light source module 212 is constituted at least from a semi-conductor laser diode and coupling lens. In this configuration, a displacing amount Δz of the beam spot in the sub scanning direction on the scan receiving surface 205 per a displacing amount Δδ in the sub scanning direction component of the relative position may be obtained as follows:

$$\Delta z = mY \times \Delta\delta$$

Further, when the light source module 212 is constituted at least from a semiconductor laser 206 and coupling lens 207, a parallel plate (e.g. a parallel plate glass) can be arranged between the semi-conductor laser and coupling lens, and a system capable of tilting the parallel plate at least on a plane having a sub scanning direction cross sectional plane component.

Figure 26:
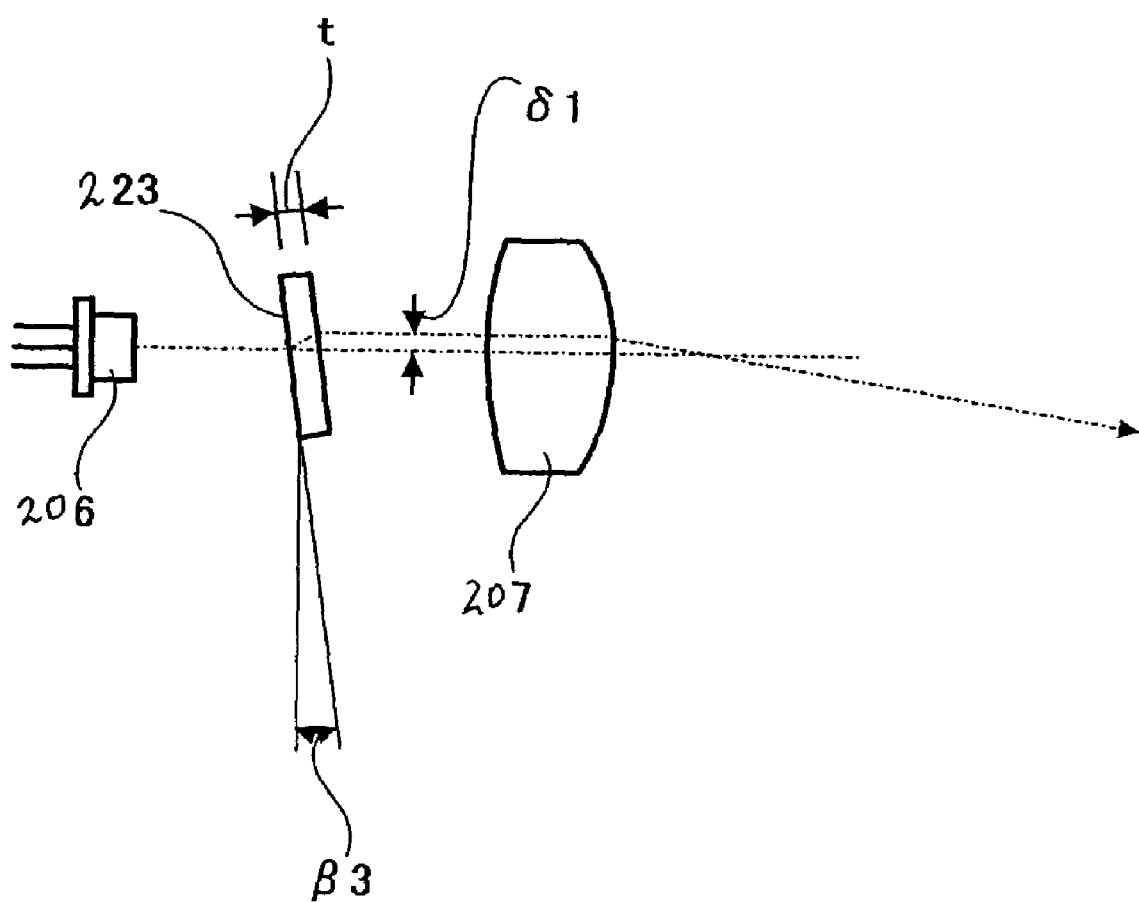
FIG. 26 is a chart illustrating an exemplary beam ejection direction-changing device using a parallel plate.

Specifically, as illustrated in FIG. 26, a thickness of the parallel plate 223 is "t", an internal refraction index is "n", an inclination angle in a sub scanning direction cross section plane is "$\beta 3$", and a shifting amount $\Delta \delta 1$ of a light beam 211 produced by the parallel plate 223 may be represented by the following formula:

$$\Delta \delta 1 = t \times \beta 3 \times [1-(1/n)]$$

Accordingly, a displacing amount $\Delta z$ of the beam spot on the scan receiving surface 205 in the sub scanning direction per the inclination angle $\beta 3$ may be calculated from the Formula 1 as follows as a Formula 6:

$$\Delta z = mZ \times \delta = mZ \times t \times \beta 3 \times [1-(1/n)]$$

FIGS. 27A, 27B, 27C and 27D illustrates a modification of the second embodiment. Specifically, the numeral number 240 denotes a four beam type light source apparatus, the numeral number 241 denotes a first light source module, the numeral number 242 denotes a second light source module, and the numeral number 243 denotes a base member. In addition, the numeral number 244 denotes a beam-combining prism, the numeral number 245 denotes a taper screw, the numeral number 246 denotes a steel ball, and the numeral number 247 denotes a first ejection beam direction-changing device. Second to fourth ejection beam direction changing devices are also provided (not shown). The numeral number 251 denotes a holder member, and the numeral numbers 252a, 252b, and 252c denote stepping motors.

Figure 27A:
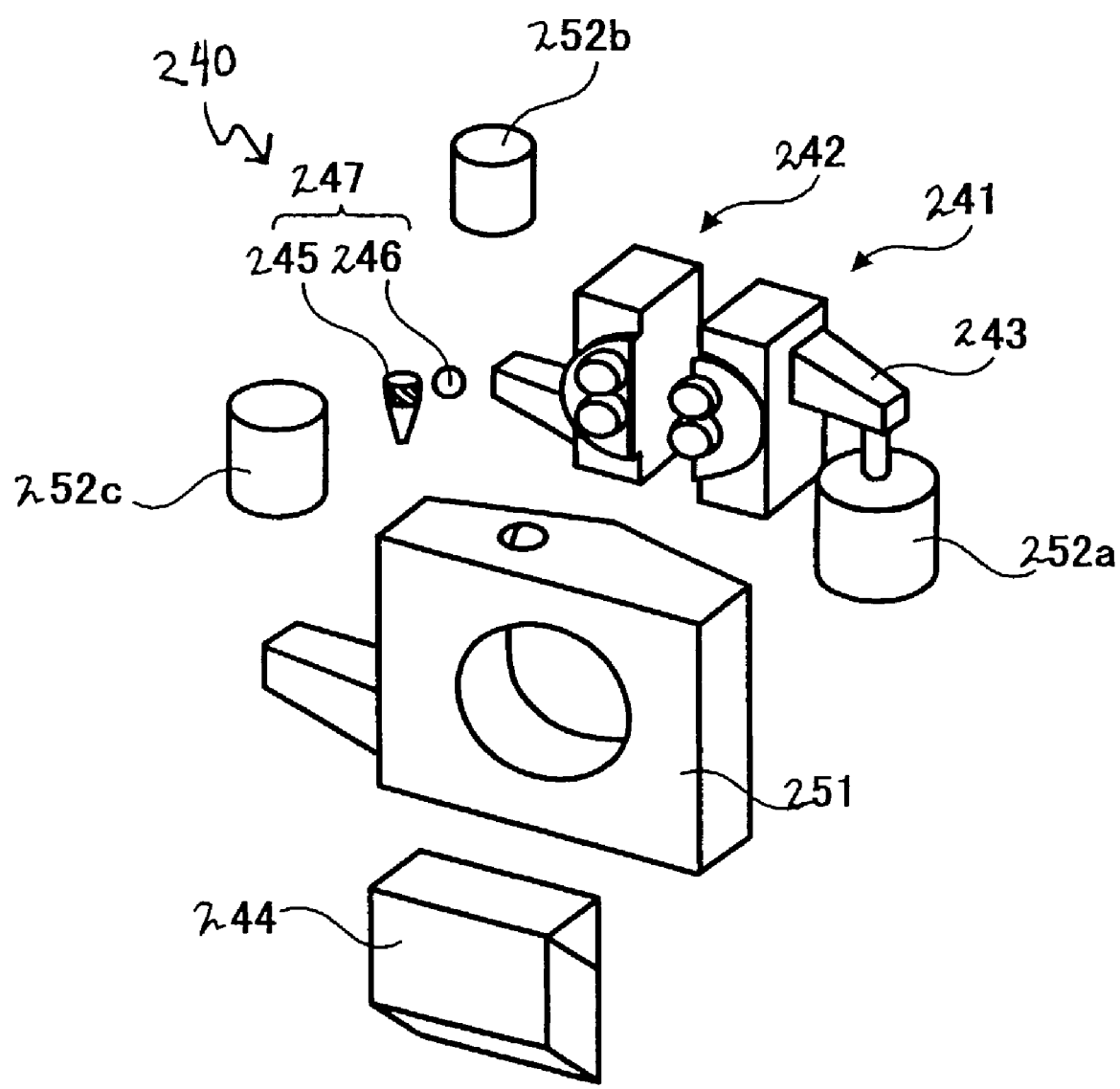
FIGS. 27A, 27B, 27C, and 27D are charts each illustrating a light source apparatus utilized in a second embodiment of the optical scanning apparatus according to the present invention.

In the explosion perspective view of the light source apparatus 240 of FIG. 27A, two pairs of semi-conductor laser diodes 206 and coupling lenses 207 are secured to a base member 243, and form the first light source module 241. The first light source module 241 is rotatably secured to the holder member 251 together with the second light source module 242 having a similar configuration. Respective pair of light beams irradiated from the first and second light source modules 241 and 242 are approximated and combined by the beam-combining prism 244. A half mirror and a deviation property of a laser light in the beam-combining prism 244 perform the combination. An aperture (not shown) then fairs the four light beams.

Figure 27B:
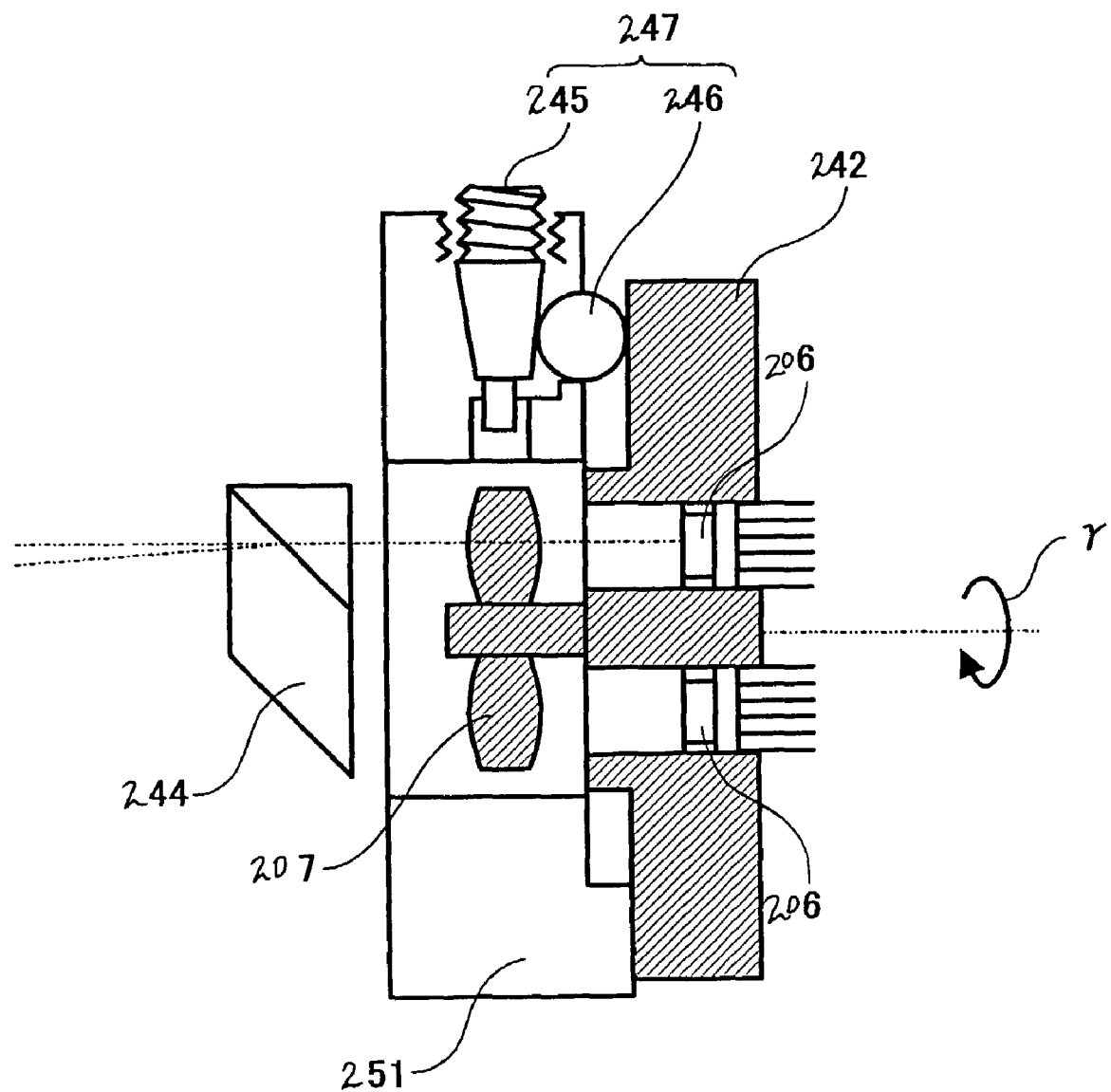

Thus, the light source apparatus 240 is formed by the first and second light source modules 241 and 242, the beam-combining prism 244, and the holder member 251 or the like. The light source apparatus 240 is integrated as a unit configuration, and accordingly, when the light source apparatus 240 is to be replaced due to deterioration or the like of the semi-conductor laser diode, replacement may easily be performed. In the light source apparatus 240, as illustrated in FIG. 27B, the beam ejection direction-changing device constituted by a tapered screw 245 and steel ball 246 may be employed.

Figure 28A:
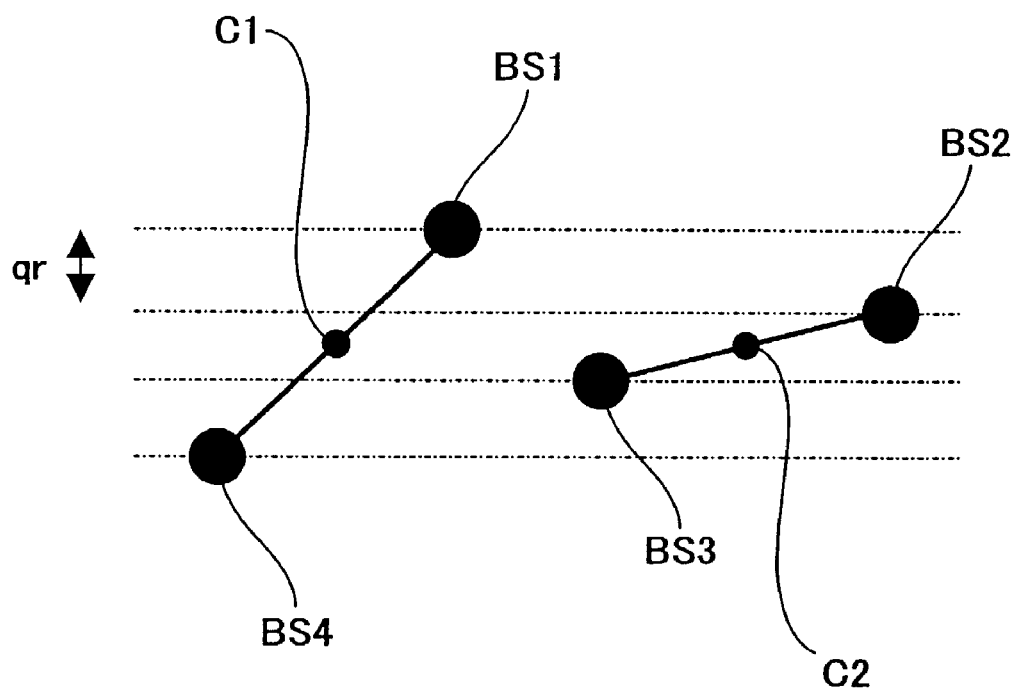
FIGS. 28A and 28B are charts illustrating a positional relation between beam spots formed in the embodiment of FIG. 27.
Figure 28B:
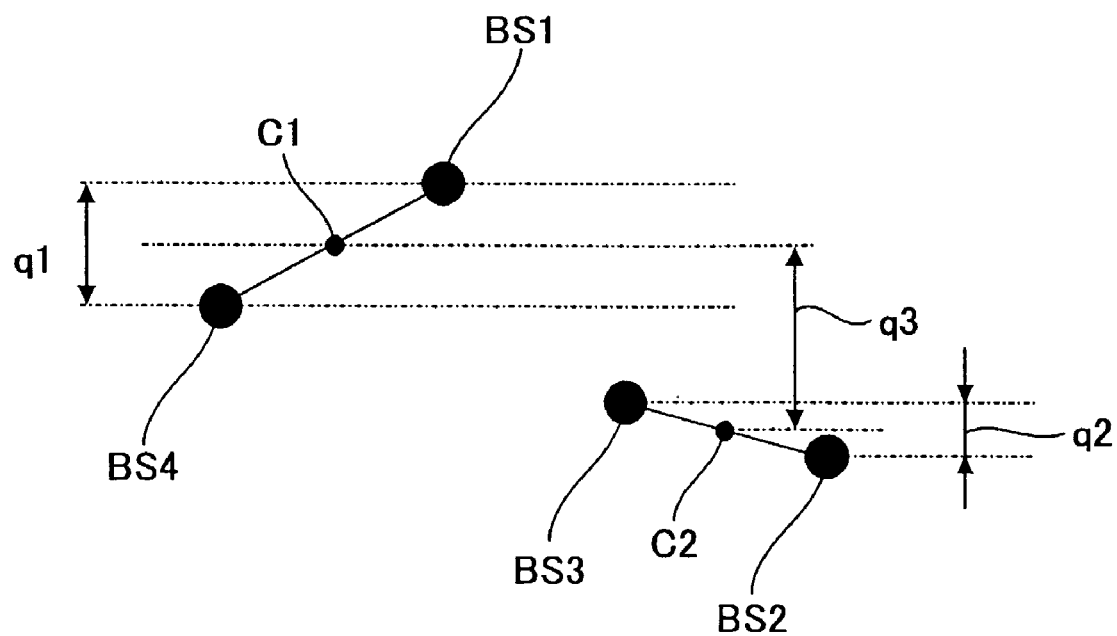

FIGS. 28A and 28B are charts illustrating position and arrangement of beam spots BS1–BS4 on a scan-receiving surface in this embodiment when scanning density is 1200 dpi. Numeral numbers BS1 and BS4 are beam spots that correspond to a pair of light beams irradiated from the first light source module 241. Numeral numbers BS2 and BS3 are beam spots, which correspond to a pair of light beams irradiated from the second light source module 242. Numeral number C1 is a central position between BS1 and BS4, and numeral number C2 is a central position between BS2 and BS3. Further, the numeral number "q1" is an interval (i.e., a beam pitch) between BS1 and BS4, and whose target value is calculated as follows:

$$3 \times qr = 3 \times 21.2 = 63.5 \ \mu m$$

The numeral number "q2" is an interval between BS2 and BS3, and whose target value "qr" is 21.2 μm. The numeral number "q3" is also an interval between C1 and C2, whose target value is 0 μm. The numeral number "qr" is a scanning line interval of 21.2 μm in the case of 12000 dpi.

When the light source apparatus 240 is built in the optical scanning apparatus (i.e., when temporary assembling is performed and before initially adjusting), each of the beam spots BS1 through BS4 may be disorderly arranged as illustrated in FIG. 28B. To adjust and equalize the interval of the respective beam spots illustrated in FIG. 28A from this condition, "q3" may be initially roughly adjusted by the first ejection beam direction changing device 247, and "q1" through "q3" may then be finely adjusted so as to fall within the respective target values by the second to fourth ejection beam direction changing devices 248 to 250.

When the initial adjustment is performed, respective ejection beam direction changing devices can be driven manually or by a stepping motor included in the light source apparatus after a beam pitch is detected. When a beam pitch varies due to a temperature change or time elapse, a change in a beam pitch may preferably be detected and the second to fourth ejection beam direction changing devices 248 to 250 may receive feedback control based upon the detection result. Accordingly, the first ejection beam direction changing device 247 used in the initial adjustment does not have to include the feedback mechanism. Specifically, a manually driven system such as a screwdriver can be employed.

In addition, when the light source module is formed by two pairs of semiconductor laser diodes and coupling lenses secured to the common base member 243, and adjustment of relative positioning of a light axis or collimating adjustment of the semiconductor laser diode to that of the coupling lens is performed with an adjusting machine including a beam combining prism 244, an assembling and building error may be removed. Thus, because beam spot intervals of q1 and q2 in the same light source module is comparatively close to a prescribed value even in a temporary assembling stage, the high sensitivity ejection beam direction changing device may be needless.

A detailed operation is now described with reference to FIGS. 27A–27D, 28A, and 28B. The first ejection beam direction changing device 147 moves the central position C2 on the scan receiving surface, and performs relative positioning of the central position C1 to the central position C2. Specifically, it changes "q3". Then, by either screwing or loosening the tapered screw 245, a posture of the second light source module 242 is changeable in a direction of an arrow β shown in the drawing via the steel ball 246. Thus, beam ejection angles of the pair of light beams from the second light source module, and accordingly the position of C1 is changeable.

Figure 27C:
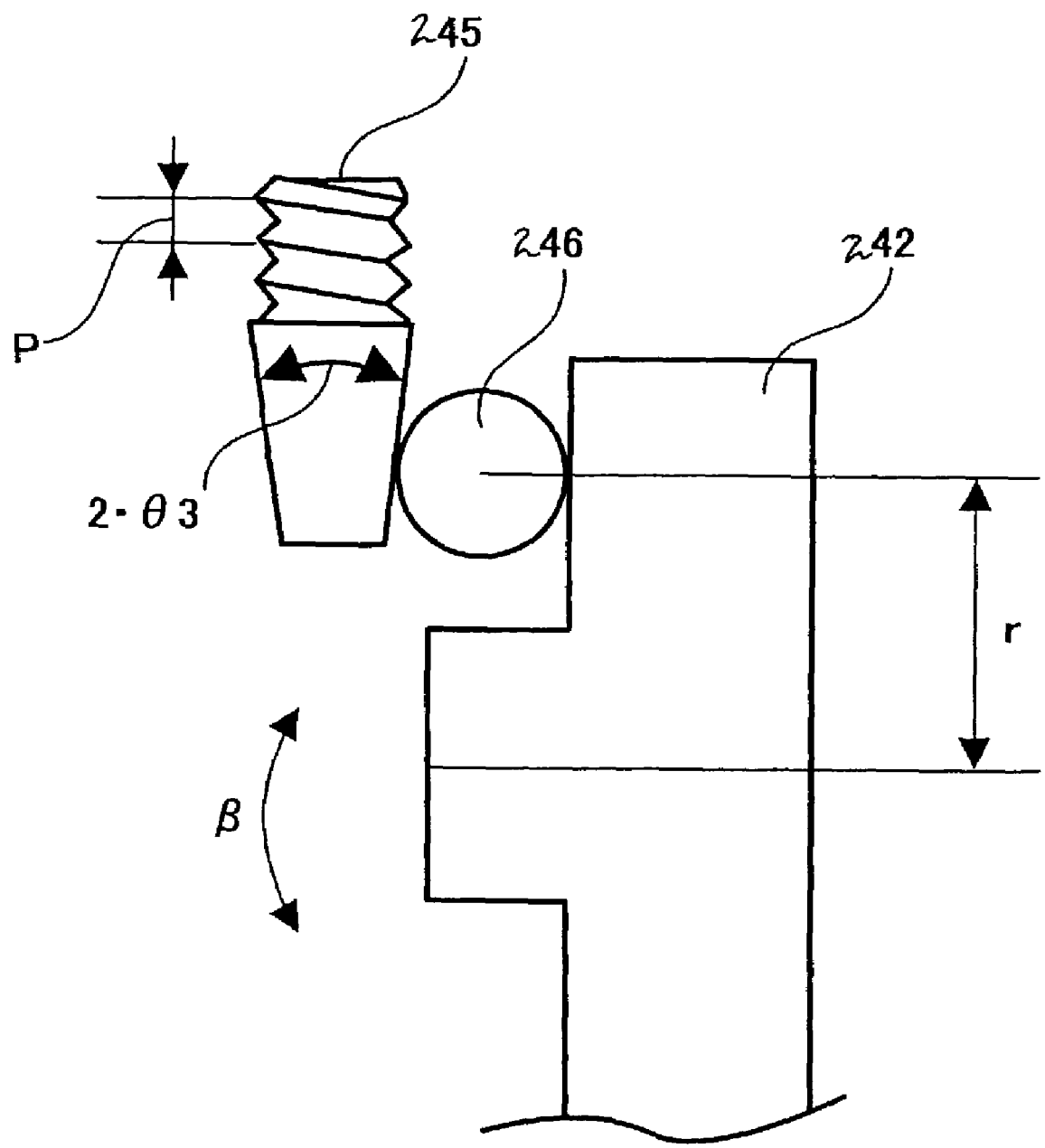

An operation of the first bream ejection angle adjusting device 247 that adjusts beam ejection angles of the pair of beams irradiated from the second light source module 242 is described with reference to FIG. 27C. When the taper angle $(2\times\theta 3)$ of the tapered screw 245 is 20°, a screw pitch "p" is 0.3 mm, a distance "r3" from the rotational axis (i.e., fulcrum) of the second light source module 242 on the sub scanning direction cross sectional plane to the steel ball (a power point) is 20 mm, and the tapered screw 245 is driven by a stepping motor (not shown) having a prescribed basic step angle 7.5°, a screwing and loosening amount "u" of the tapered screw 245 per one step of the stepping motor may be represented as follows:

$$u=(s/360°) \times p=(7.5°/360°) \times 0.5=0.0104 \text{ mm}$$

Simultaneously, a moving amount (both in left and right wards) "V" of the steel ball 246 may be represented as follows:

$$v=u \times \tan\theta 3=0.0104 \times \tan(10°)=0.0018 \text{ mm}$$

In such a situation, if a deviation amount in a direction β of the second light source module 242 is β3, the following Formula may be established:

$$\tan(\beta 3)=v/r3=0.0018/20$$

Simultaneously, the moving amount Δz of the beam spots BS2 and BS3 on the scan receiving surface may be obtained from the formula 2 as follows:

$$\Delta z = mZ \times fcol \times \tan\beta 3 = 5.3 \times 15 \times 0.00053/20 = 0.0073 \text{ mm} = 7.3 \text{ μm}$$

Specifically, two beam spots BS2 and BS3 can be simultaneously moved and adjusted in the sub scanning direction at a resolution limit of 7.3 μm.

Figure 27D:
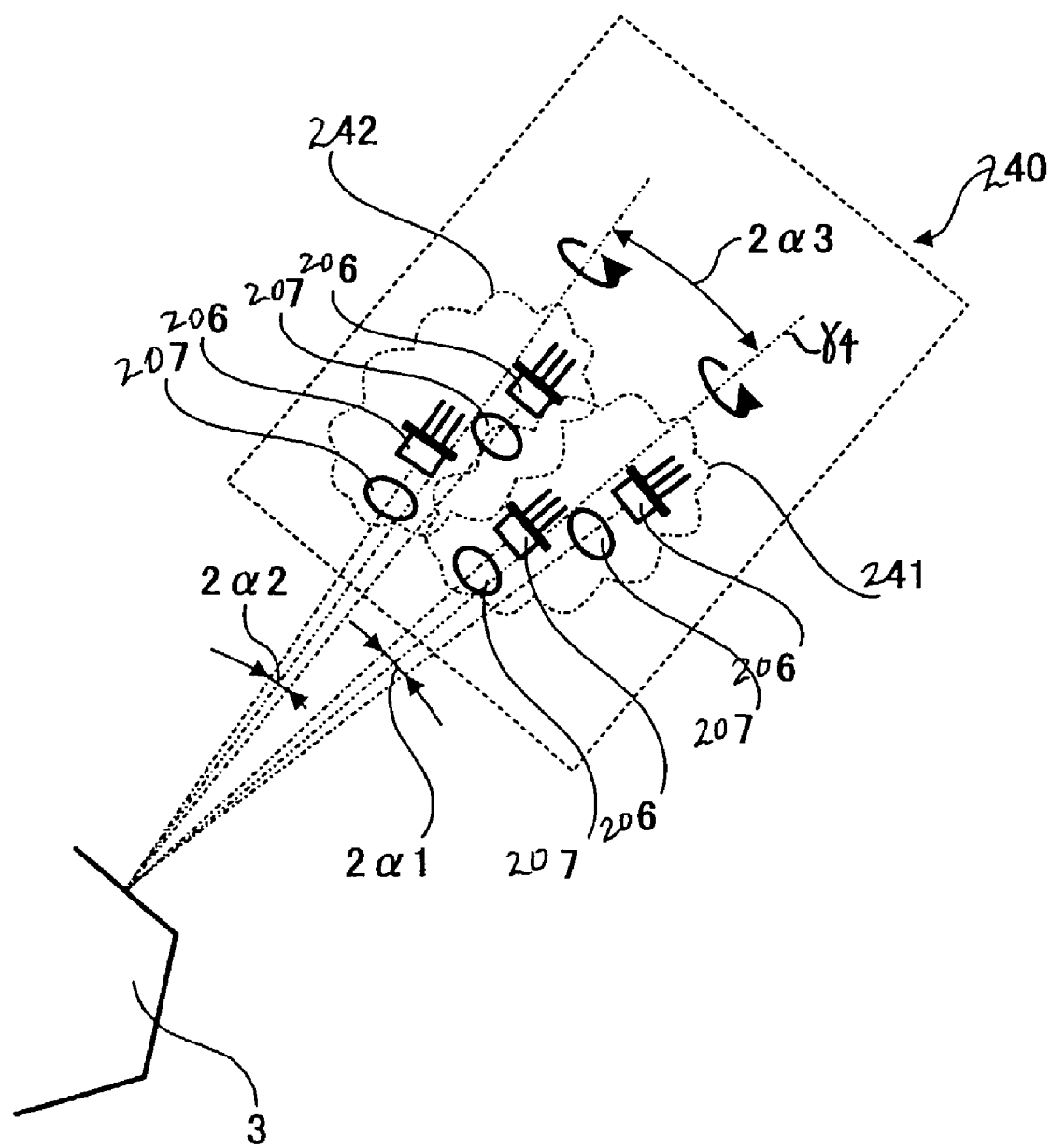

In addition, the light source apparatus 240 includes the second beam ejection direction changing device 248 so as to adjust an interval "q1". The second beam ejection direction changing device is configured to rotate around an axis γ4 parallel to a bisector of the two light beams irradiated from the first light source module 241 as illustrated in FIG. 27D. Specifically, the beam ejection direction-changing device of FIG. 25 is applied thereto. In FIG. 27D, light beams practically returned by the beam combining prism 244 is shown while being extended.

Specifically, to suppress generation of deviation of an optical property between beams, four light beams are configured to intersect in the vicinity of a deviation reflection surface of the polygon mirror 203. Namely, an angle formed by two light beams irradiated from the first light source module 241 is set to a mount of (2×α1), an angle formed by two light beams irradiated from the second light source module 242 is set to a mount of (2×α2), and an angle formed by respective bisectors of two light beams irradiated from the respective light source module 241 and 242 is set to a mount of (2×α3). In addition, the following relation may be established and set:

$$2 \times \alpha 1 = 2 \times \alpha 2 = 3°$$

$$2 \times \alpha 3 = 5°$$

When it is assumed the first light source module 241 is operated and rotated by a power point distanced from a rotational axis by a prescribed amount (e.g. r4=20 mm) by the stepping motor 252a having a basic step angle (s=7.5°) and meshed with a screw having a screw pitch (p=0.5 mm), an operating amount "u" of the power point per one step of the stepping motor 252a is represented as follows:

$$u=(s/360°) \times p=(7.5°/360°) \times 0.5=0.0104 \text{ mm}$$

Thus, if a rotational amount of the first light source module 241 in a direction of γ is suppose to be γ4, the following relation is established:

$$\sin(\gamma 4)=u/r4=0.0104/20$$

In addition, a displacing amount Δq1 on the scan receiving surface may be obtained from the Formula 5 when θ2 is supposed to equal to α1 as follows (Formula 7):

$$\Delta q1 = 2 \times \Delta z = 2 \times mZ \times fcol \times \tan(\alpha 1) \times \sin(\gamma)$$

$$\Delta q1 = 2 \times 5.3 \times 15 \times \tan(1.5°) \times (0.0104/20) = 0.0022 \text{ mm} = 2.2 \text{ μm}$$

Referring to the configurations of FIGS. 27A and 27B, a rotational center of the first light source module 241 intermediates the pair of optical axis of the two coupling lenses 207 and corresponds to a rotational axis shown by γ in FIG. 27B. However, it is preferably rotated around the bisector of the two light beams (i.e., a rotational axis shown by γ4 in FIG. 27D) combined by the beam-combining prism 244.

Further, the light source apparatus 240 includes a third beam ejection direction changing device so as to adjust the interval q3 on the scan-receiving surface. Both configuration and function of the third beam ejection direction changing device is substantially the same to the above-described second beam ejection direction changing device.

In addition, similar to the first beam ejection direction changing device 247, a relative positioning of central positions C1 and C2 on the scan receiving surface may be enabled by the fourth beam ejection direction changing-device included in the light source apparatus 240. Both configuration and function of an adjustment mechanism of the fourth beam ejection direction changing device 250 is substantially the same to the above-described second and third beam ejection direction changing devices 248 and 249, but is different from the first beam ejection direction changing device 247.

Specifically, when the basic step angle "s" of the stepping motor 252c, and a distance "r" from the rotational axis to the power point are substantially the same to those of the second beam ejection direction changing device 248, and a parameter α1 in the formula 207 is replaced with α3, a displacing amount Δq3 on the scan receiving surface can be obtained as the follows:

$$\Delta q3 = 2 \times mZ \times fcol \times \tan(\alpha 3) \times \sin(\gamma) = 2 \times 5.3 \times 15 \times \tan(2.5°) \times (0.0104/20) = 0.0036 \text{ mm} = 3.6 \text{ μm}$$

As described above, the light source apparatus 240 includes four adjustment devices so as to adjust a beam spot on the scan-receiving surface. Each function may now be summarized. The first beam ejection direction changing device 247 moves the second light source module 242 on a sub scanning direction cross sectional plane, and adjusts the interval "q3" between central positions c1 and c2 of the beam spots. The second beam ejection direction changing device moves the first light source module 241 around a rotational axis almost parallel to an ejection beam, and adjusts the interval "q1". The third beam ejection direction changing device moves the second light source module 242 around a rotational axis almost parallel to an ejection beam, and adjusts the interval "q2". The fourth beam ejection direction changing device moves the light source apparatus 240 around a rotational axis almost parallel to an ejection beam, and adjusts the interval "q3".

In addition, if a feedback adjustment mechanism is employed and the respective second to fourth beam ejection direction changing devices 248 to 250 are driven as low sensitivity devices by a stepping motor or similar device such as a piezoelectric element based upon beam pitch detection result, beam pitch correction may automatically be enabled.

Further, the first beam ejection direction changing devices 247 as a relatively high sensitivity adjustment device is preferably used when a light source apparatus is assembled and initial adjustment is performed. Accordingly, although the stepping motor 252a rotates the tapered screw 245 and drives the first beam ejection direction changing devices 247, a screw driver or the like can manually be used instead of the stepping motor 252a.

In addition, the second and third beam direction changing devices may be not independent from the fourth beam ejection direction changing device. As a result, when the fourth beam ejection direction changing device is driven, both interval between beam spots BS1 and BS4, and BS2 and BS3 may vary. Accordingly, adjustment should be performed considering such behavior.

Figure 29A:
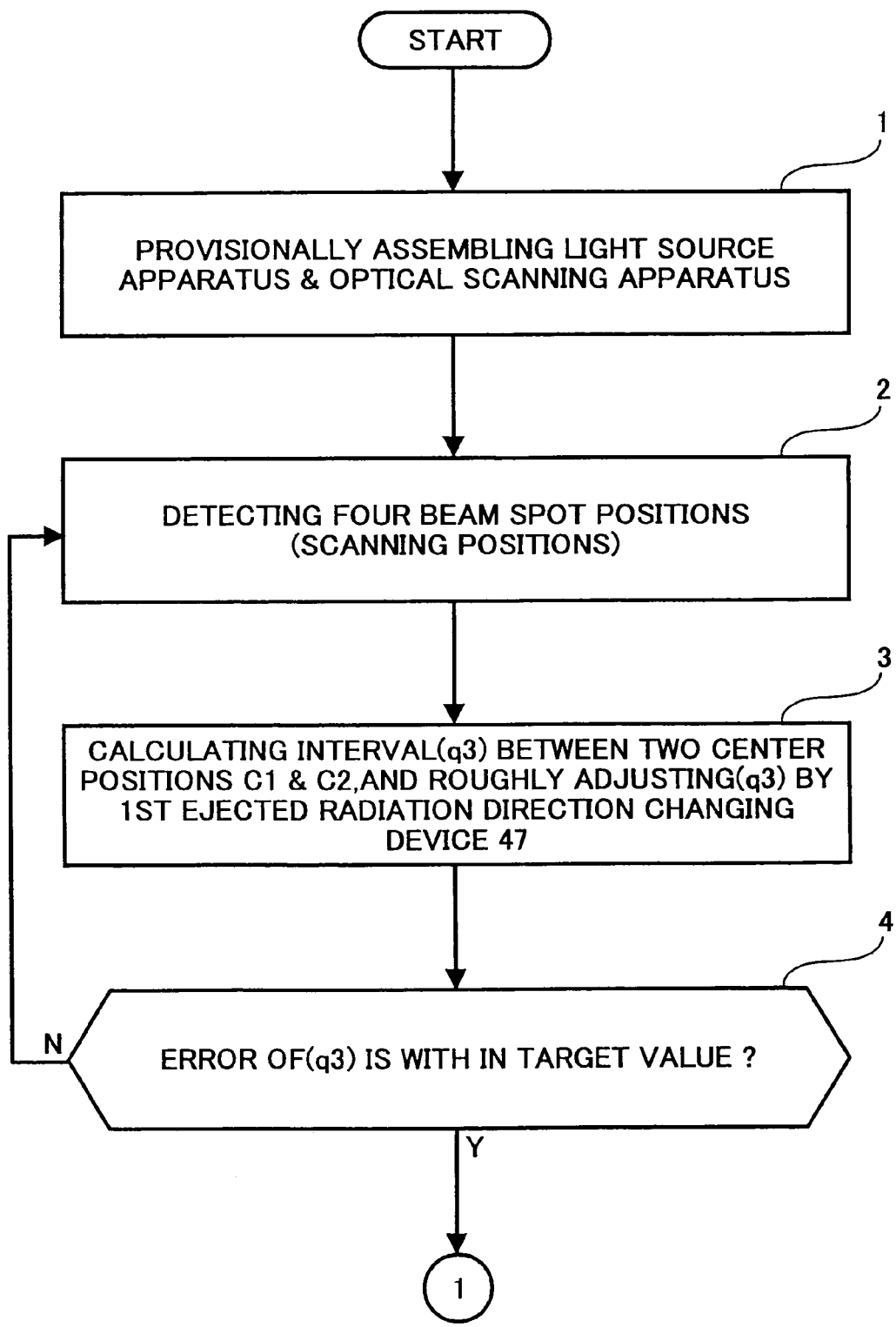
FIG. 29, which is a combination of FIGS. 29A and 29B, is a flowchart illustrating a pitch adjusting operation using a beam ejection direction changing device.
Figure 29B:
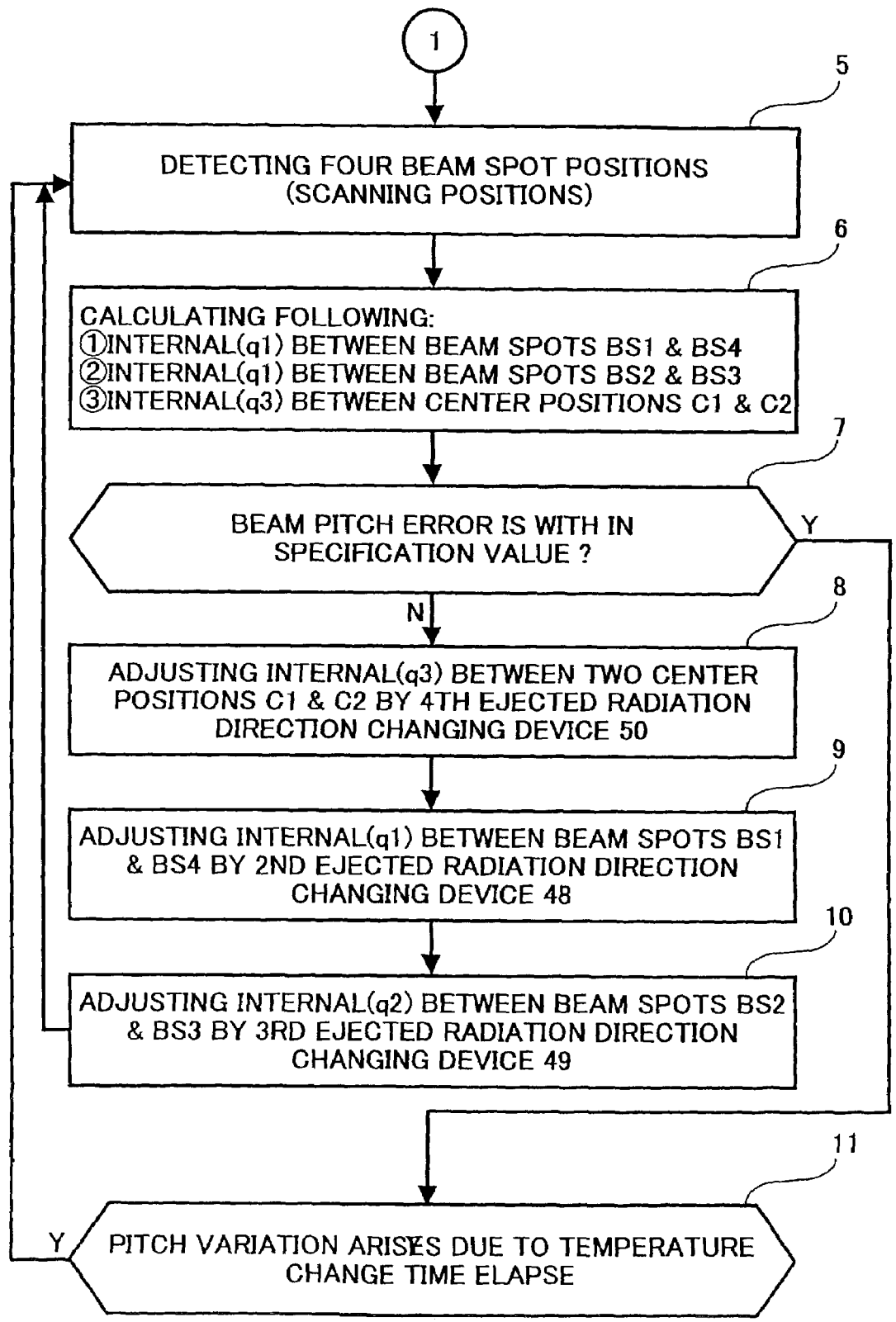
Figure 30A:
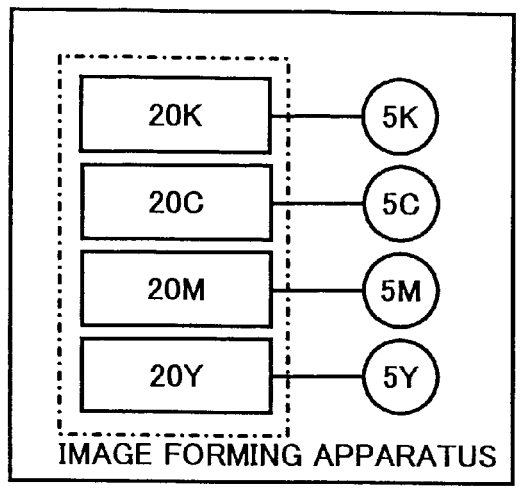
FIGS. 30A, 30B, 30C, and 30D are charts illustrating exemplary configurations of color image forming apparatuses employing the optical scanning apparatuses of the present invention.
Figure 30B:
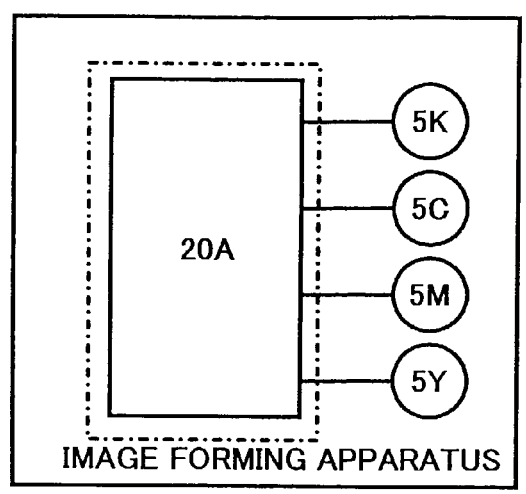
Figure 30C:
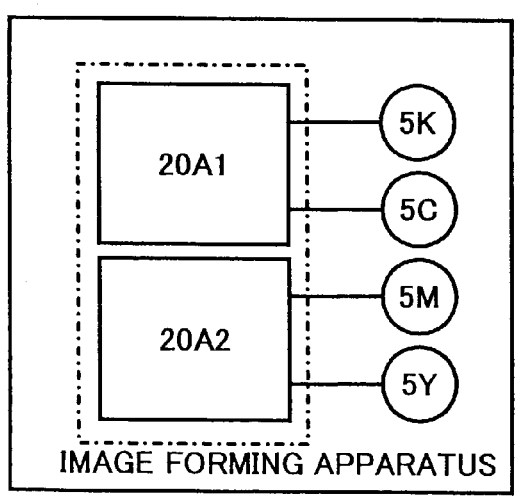
Figure 30D:
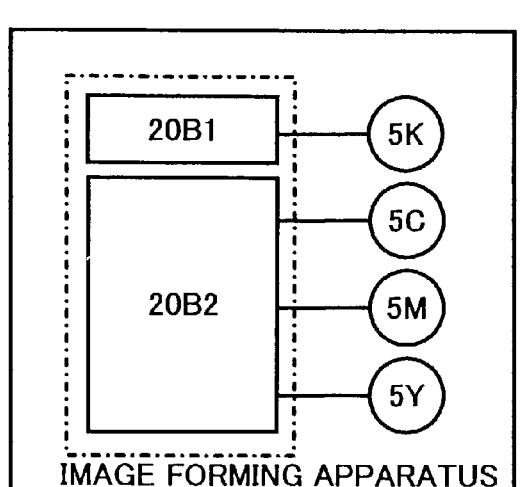

Thus, in the adjustment flow chart of FIGS. 29A and 29B, a temporary assembling of a light source apparatus and optical scanning apparatus may initially be performed (in step S1). Then, the interval "q3" is calculated, and the first beam ejection direction changing device 247 roughly adjusts the "q3" in step S3. It is then determined if error of the q3 is within a target value that the second to fourth beam ejection direction changing devices can perform fair or normal adjustment. If it is out of the target value, the adjustment flow returns and begins step S2 again. If it is within the target value, the adjustment process goes to step S5. In such a manner, a beam pitch may be initially roughly adjusted when temporary assembling is performed in a factory.

Subsequently, four beam positions as scanning positions are detected in step S5. Then, the intervals "q1", "q2", and "q3" between respective beam spots BS1 and BS4, BS2 and BS3, and central positions c1 and c2 are calculated in step S6. Then, it is determined if error of the beam pitch is within a specification value in step S7. If it is within the specification value, the adjustment process goes to step S11. If it is without the specification value, the adjustment process goes to step S8.

Then, the fourth beam ejection direction changing device 250 adjusts the interval "q3" in step S8, the second beam ejection direction changing device then adjusts the interval "q1" in step S9, and the third beam ejection direction changing device 149 adjusts the interval "q2" in step S10. The adjustment process then returns to step S5 and repeats the subsequent steps.

In step 11, if a beam pitch changes along a temperature change and time elapsing is determined. If the beam pitch changes, the adjustment process returns to step S5.

The steps S5 to S11 may perform the initial adjustment and the earlier described feedback correction.

In this embodiment, a device for detecting a change in posture of a light source module is utilized as a beam ejection direction changing device. However, the beam pitch changing device can be configured by optically or mechanically arranging and combining various beam ejection directions changing devices in appropriate.

If an image forming apparatus employs the above-described optical scanning apparatus, because a plurality of light beams can simultaneously be scanned, high speed and density printing can be performed. In addition, because a number of rotations of the polygon scanner can be decreased to achieve the same printing speed and scanning density to those of the single beam light source apparatus, power consumption and heat generation may be suppressed. In addition, noise may be small.

Further, in an image forming apparatus such as a digital color copier and printer or the like, a tandem type may be sometimes adopted, in such a manner that PC devices such as PC drums are serially arranged in a feeding direction of an image recording medium such as a sheet in an order of colors such as black (K), cyan (C), magenta (M), and yellow (Y). As illustrated in FIGS. 30A, 30B, 30C and 30D, a plurality of optical scanning apparatuses may be integrated, or separated into two or four bodies (10K, 10C, 10M and 10Y) in a similar manner to those illustrated in FIGS. 14A–14D.

The mechanisms and processes set forth in the present invention may be implemented using one or more conventional general purpose microprocessors and/or signal processors programmed according to the teachings in the present specification as will be appreciated by those skilled in the relevant arts. Appropriate software coding can readily be prepared by skilled programmers based on the teachings of the present disclosure, as will also be apparent to those skilled in the relevant arts. However, as will be readily apparent to those skilled in the art, the present invention also may be implemented by the preparation of application-specific integrated circuits by interconnecting an appropriate network of conventional component circuits or by a combination thereof with one or more conventional general purpose microprocessors and/or signal processors programmed accordingly. The present invention thus also includes a computer-based product which may be hosted on a storage medium and include, but is not limited to, any type of disk including floppy disks, optical disks, CD-ROMs, magnet-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise than as specifically described herein.

What is claimed is:

1. A multi-beam scanning apparatus, comprising:
   at least two light source sections each including a pair of semiconductor laser diodes and coupling lenses, said coupling lenses coupling respective light beams irradiated from the pair of semiconductor laser diodes, and each of said at least two light source sections being configured to rotate independently;
   a holding member configured to hold the at least two light source sections and to rotate each of the at least two light source sections together;
   a light beam-approximating device configured to approximate a pair of light beams irradiated from the pair of semi-conductor laser diodes;
   a scanning device configured to diffuse and scan a scan receiving surface with the pair of light beams in a spot shape;
   a beam pitch detecting device configured to respectively detect a beam pitch between beam spots formed by the pair of light beams irradiated from the laser diodes on the scan receiving surface; and
   a beam pitch correcting device configured to initially correct the beam pitch by automatically rotating at least one of the two light source sections around an optical axis and to secondly adjust a distance between points C1 and C2 by automatically rotating the holding member, wherein
   C1 is a virtual middle position between beam spots created by the pair of light beams irradiated from the pair of semi-conductor laser diodes in a first of the at least two light source sections,
   C2 is a virtual middle position between beam spots created by the pair of light beams irradiated from the pair of semi-conductor laser diodes in a second of the at least two light source sections, a distance between beams spots included in a same pair of beam spots in a main-scanning direction is shorter than a distance between corresponding beam spots in different pairs of beam spots in the main-scanning direction, and the at least two light source sections are arranged in the main-scanning direction and the pair of semiconductor laser diodes are arranged in a sub-scanning direction.

2. The multi-beam scanning apparatus according to claim 1, further comprising:

a control device configured to control the beam pitch correcting device to operate in accordance with a detection result obtained by the beam pitch detecting device.

3. The multi-beam scanning apparatus according to claim 2, wherein said beam pitch detecting device includes:

a cover having a diagonal side and configured to obliquely cover the plurality of photo-diodes.

4. The multi-beam scanning apparatus according to claim 1, further comprising:

a control device configured to control the beam pitch correcting device to operate in accordance with a detection result obtained by the beam pitch detecting device.

5. The multi-beam scanning apparatus of claim 1, wherein the at least two light source sections are adjacent to each other.

* * * * *